United States Patent
Thesling

(10) Patent No.: US 7,680,040 B2
(45) Date of Patent: Mar. 16, 2010

(54) ADAPTIVE CODING AND MODULATION FOR BROADBAND DATA TRANSMISSION

(75) Inventor: William H. Thesling, Hudson, OH (US)

(73) Assignee: ViaSat, Inc., Carlsbad, CA (US)

(\*) Notice: Subject to any disclaimer, the term of this patent is extended or adjusted under 35 U.S.C. 154(b) by 585 days.

(21) Appl. No.: 11/554,206

(22) Filed: Oct. 30, 2006

(65) Prior Publication Data
US 2007/0116151 A1 May 24, 2007

Related U.S. Application Data

(60) Provisional application No. 60/731,122, filed on Oct. 28, 2005.

(51) Int. Cl.
*H04J 3/24* (2006.01)

(52) U.S. Cl. .................. 370/230; 370/329; 455/464

(58) Field of Classification Search ......... 370/206, 370/230, 329, 468; 455/464; 714/755
See application file for complete search history.

(56) References Cited

U.S. PATENT DOCUMENTS

| | | | |
|---|---|---|---|
| 4,819,629 A | 4/1989 | Jonson | |
| 5,586,550 A | 12/1996 | Ivri et al. | |
| 5,914,946 A | 6/1999 | Avidor et al. | |
| 5,917,900 A | 6/1999 | Allison et al. | |
| 6,122,280 A | 9/2000 | Hamal et al. | |
| 6,138,012 A | 10/2000 | Krutz et al. | |
| 6,385,462 B1 | 5/2002 | Baum et al. | |
| 6,701,129 B1 | 3/2004 | Hashem et al. | |
| 6,765,921 B1 | 7/2004 | Stacey et al. | |
| 6,804,211 B1 * | 10/2004 | Klein et al. ................. 370/329 |
| 6,885,657 B1 | 4/2005 | Rabenko et al. | |
| 6,990,529 B2 * | 1/2006 | Yang et al. .................. 709/235 |
| 7,043,210 B2 | 5/2006 | Zhu et al. | |
| 7,126,996 B2 | 10/2006 | Classon et al. | |
| 7,319,669 B1 | 1/2008 | Kunz et al. | |
| 7,450,602 B2 | 11/2008 | Vazquez Castro | |
| 7,567,504 B2 | 7/2009 | Darling et al. | |
| 2002/0036992 A1 | 3/2002 | Balachandran et al. | |

(Continued)

FOREIGN PATENT DOCUMENTS

FR 2783431 A1 9/1998

(Continued)

OTHER PUBLICATIONS

U.S. Appl. No. 11/554,244, Office Action dated Mar. 13, 2009, 34 pages.

(Continued)

*Primary Examiner*—Albert T Chou
(74) *Attorney, Agent, or Firm*—Townsend and Townsend and Crew LLP

(57) ABSTRACT

A process is described to build physical layer frames with a modcode adapted to the signal quality of a destination terminal. Data packets assigned to the same modcode may be sent in the same frame, although packets associated with higher modcodes may be used to complete a frame before switching to the applicable higher modcode for construction of subsequent frames. After an interval, the order of progression is restarted with an out of order packet above a threshold age. Flow control filtering mechanisms and a variable reliability margin may be used to adapt dynamically to the current data traffic conditions.

21 Claims, 22 Drawing Sheets

U.S. PATENT DOCUMENTS

| | | |
|---|---|---|
| 2002/0118666 A1 | 8/2002 | Stanwood et al. |
| 2002/0131441 A1 | 9/2002 | Trachewsky et al. |
| 2002/0150115 A1 | 10/2002 | Onvural et al. |
| 2002/0183020 A1 | 12/2002 | Zhu et al. |
| 2003/0045307 A1* | 3/2003 | Arviv et al. ................. 455/464 |
| 2003/0054816 A1 | 3/2003 | Krebs et al. |
| 2003/0110435 A1 | 6/2003 | Wu et al. |
| 2003/0121030 A1 | 6/2003 | Koob et al. |
| 2003/0176161 A1 | 9/2003 | Dale et al. |
| 2003/0206559 A1 | 11/2003 | Trachewsky et al. |
| 2004/0001493 A1 | 1/2004 | Cloonan et al. |
| 2004/0085976 A1 | 5/2004 | Dale et al. |
| 2004/0100941 A1 | 5/2004 | Lim et al. |
| 2004/0120474 A1 | 6/2004 | Lopponen et al. |
| 2004/0141601 A1 | 7/2004 | Cai et al. |
| 2004/0208121 A1* | 10/2004 | Gin et al. .................... 370/230 |
| 2004/0247122 A1 | 12/2004 | Hobrock et al. |
| 2005/0058098 A1 | 3/2005 | Klein et al. |
| 2005/0060760 A1 | 3/2005 | Jaffe et al. |
| 2005/0138521 A1* | 6/2005 | Suzuki et al. ............... 714/755 |
| 2005/0147034 A1 | 7/2005 | Zhao et al. |
| 2005/0213587 A1 | 9/2005 | Cho et al. |
| 2006/0067325 A1 | 3/2006 | Kounavis et al. |
| 2006/0104299 A1 | 5/2006 | Vazquez |
| 2006/0126576 A1 | 6/2006 | Dale et al. |
| 2007/0110098 A1 | 5/2007 | Hart et al. |
| 2007/0116152 A1 | 5/2007 | Thesling |
| 2007/0206525 A1 | 9/2007 | Miller et al. |
| 2007/0271388 A1 | 11/2007 | Bowra et al. |
| 2008/0144493 A1 | 6/2008 | Yeh |
| 2009/0028187 A1* | 1/2009 | Dale et al. .................. 370/468 |
| 2009/0052323 A1 | 2/2009 | Breynaert et al. |

FOREIGN PATENT DOCUMENTS

| | | |
|---|---|---|
| WO | WO 01/10046 A2 | 2/2001 |
| WO | WO 03/019805 A1 | 3/2003 |

OTHER PUBLICATIONS

International Search Report, mailed Jan. 15, 2009, International Application No. PCT/US08/86014, filed Dec. 9, 2008, 2 pages.

A. Morello et al., "New DVB Standard for DSNG—and Contribution Satellite Links", Sep. 21, 1998, pp. 31-45, EBU Technical Review, European Broadcasting Union, Brussels, BE, No. 277.

U.S. Appl. No. 11/554,226, Office Action dated Jan. 23, 2009, 17 pages.

International Search Report and Written Opinion of the International Search Authority dated May 31, 2007 corresponding to PCT International Application No. PCT/US2006/043258, filed Oct. 30, 2006.

Office Action dated Jul. 9, 2009, U.S. Appl. No. 11/554,226, 29 pages.

U.S. Appl. No. 11/554,263, Office Action dated Sep. 4, 2009, 21 pages.

U.S. Appl. No. 11/554,244, Notice of Allowance mailed Oct. 20, 2009, 8 pages.

* cited by examiner

200

| Modcode | Signal Quality Range (SNR) |
|---|---|
| QPSK 1/4 | Range 1 |
| QPSK 1/3 | Range 2 |
| QPSK 2/5 | Range 3 |
| QPSK 1/2 | Range 4 |
| QPSK 3/5 | Range 5 |
| QPSK 2/3 | Range 6 |
| QPSK 3/4 | Range 7 |
| QPSK 4/5 | Range 8 |
| QPSK 5/6 | Range 9 |
| QPSK 8/9 | Range 10 |
| QPSK 9/10 | Range 11 |
| 8PSK 3/5 | Range 12 |
| 8PSK 2/3 | Range 13 |
| 8PSK 3/4 | Range 14 |
| 8PSK 5/6 | Range 15 |
| 8PSK 8/9 | Range 16 |
| 8PSK 9/10 | Range 17 |
| 16APSK 2/3 | Range 18 |
| 16APSK 3/4 | Range 19 |
| 16APSK 4/5 | Range 20 |
| 16APSK 5/6 | Range 21 |
| 16APSK 8/9 | Range 22 |
| 16APSK 9/10 | Range 23 |
| 32APSK 3/4 | Range 24 |
| 32APSK 4/5 | Range 25 |
| 32APSK 5/6 | Range 26 |
| 32APSK 8/9 | Range 27 |
| 32APSK 9/10 | Range 28 |

205 — Modcode
210 — Signal Quality Range (SNR)

| MAC Addr | SNR |
|---|---|
| MAC Addr 1 | A |
| MAC Addr 2 | B |
| MAC Addr 3 | C |
| MAC Addr 4 | D |
| MAC Addr 5 | E |
| MAC Addr 6 | F |
| MAC Addr 7 | G |
| ⋮ | ⋮ |
| MAC Addr n | N |

ADAPTIVE CODING AND MODULATION FOR BROADBAND DATA TRANSMISSION

CROSS-REFERENCE TO RELATED APPLICATIONS

This application claims priority from co-pending U.S. Provisional Patent Application No. 60/731,122, filed Oct. 28, 2005, entitled "ADAPTIVE CODING AND MODULATION FOR BROADBAND DATA TRANSMISSION," which is hereby incorporated by reference, as if set forth in full in this document, for all purposes.

This application is related to the following U.S. patent applications: U.S. patent application Ser. No. 11/554,226, filed Oct. 30, 2006, entitled "ADAPTIVE CODING AND MODULATION QUEUING METHODS AND DEVICES"; U.S. patent application Ser. No. 11/554,244, filed Oct. 30, 2006, entitled "ADAPTIVE CODING AND MODULATION USING LINKED LIST DATA STRUCTURES"; and U.S. patent application Ser. No. 11/554,263, filed Oct. 30, 2006, entitled "ADAPTIVE CODING AND MODULATION FLOW CONTROL AND TRAFFIC SHAPING METHODS AND DEVICES". This application hereby incorporates by reference herein the content of each of the aforementioned applications in their entirety and for all purposes.

FIELD OF THE INVENTION

The present invention relates to wireless communications in general and, in particular, to adaptive coding and modulation.

BACKGROUND OF THE INVENTION

Bi-directional wireless systems (such as satellite) may benefit from the use of adaptive coding and modulation ("ACM"). Using ACM, the modulation format and Forward Error Correction ("FEC") codes for a signal may be adapted to better match the link conditions for each user in a multi-user system. A return channel or other means may be used to report the conditions of a receiving terminal. These link conditions are often characterized by the individual user's (or terminal's) signal to noise ratio ("SNR"). In a broadcast system, for example, the waveform broadcast to a number of users includes data packets designated only for an individual terminal (or small group of terminals). A message transmitted to a user requires fewer symbols (and thus less time) when a higher order modulation and higher code rate is used. Lower order modulation and lower code rate are more reliable but require more time to transmit the same size message. Using ACM, each packet may be transmitted at an optimized modulation and coding ("modcode") level given the destination terminal's link conditions.

Wireless channels may suffer from time varying channel conditions. Signals traveling in changing environmental conditions may be scattered, reflected, and diffracted, causing varying channel conditions over time. These changes may, for example, be due to changing weather conditions or movement of objects. There is a need for new ways to shape and control ACM data traffic dynamically, so that the traffic may be more efficiently transmitted to select terminals.

BRIEF SUMMARY OF THE INVENTION

A process is described to build physical layer frames with a modcode adapted to the signal quality of a destination terminal. Data packets assigned to the same modcode are generally sent in the same frame, although packets associated with higher modcodes may be used to complete a frame before switching to the applicable higher modcode for construction of subsequent frames. After certain time intervals, an order of progression is restarted with an out of order packet above a threshold age. Flow control filtering mechanisms and a variable reliability margin may be used to adapt dynamically to the current data traffic conditions.

In one set of embodiments, packet forwarding queues are used to control the flow of packets according to modcode. Each queue is assigned to a different modcode, and is thereby associated with a signal quality range. Packets are placed into a queue associated with a signal quality range encompassing the link to which the packet is destined. In another set of embodiments, packets are associated with elements of a linked list. In such embodiments, the flow of packets is controlled by iterating through the linked list to identify packets within select signal quality ranges. Various device and system configurations are described to implement the processes set forth above, as well.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2A illustrates an example of a modcode table that may be used to implement ACM according to various embodiments of the present invention.

FIG. 2B illustrates an example of an address/SNR table that may be used to implement ACM according to various embodiments of the present invention.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims. Different aspects and elements of the embodiments may be combined in a similar manner.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. It should also be appreciated that the following systems, methods, and software may be a component of a larger system, wherein other procedures may take precedence over or otherwise modify their application. Also, a number of steps may be required before, after, or concurrently with the following embodiments.

Figure 1:
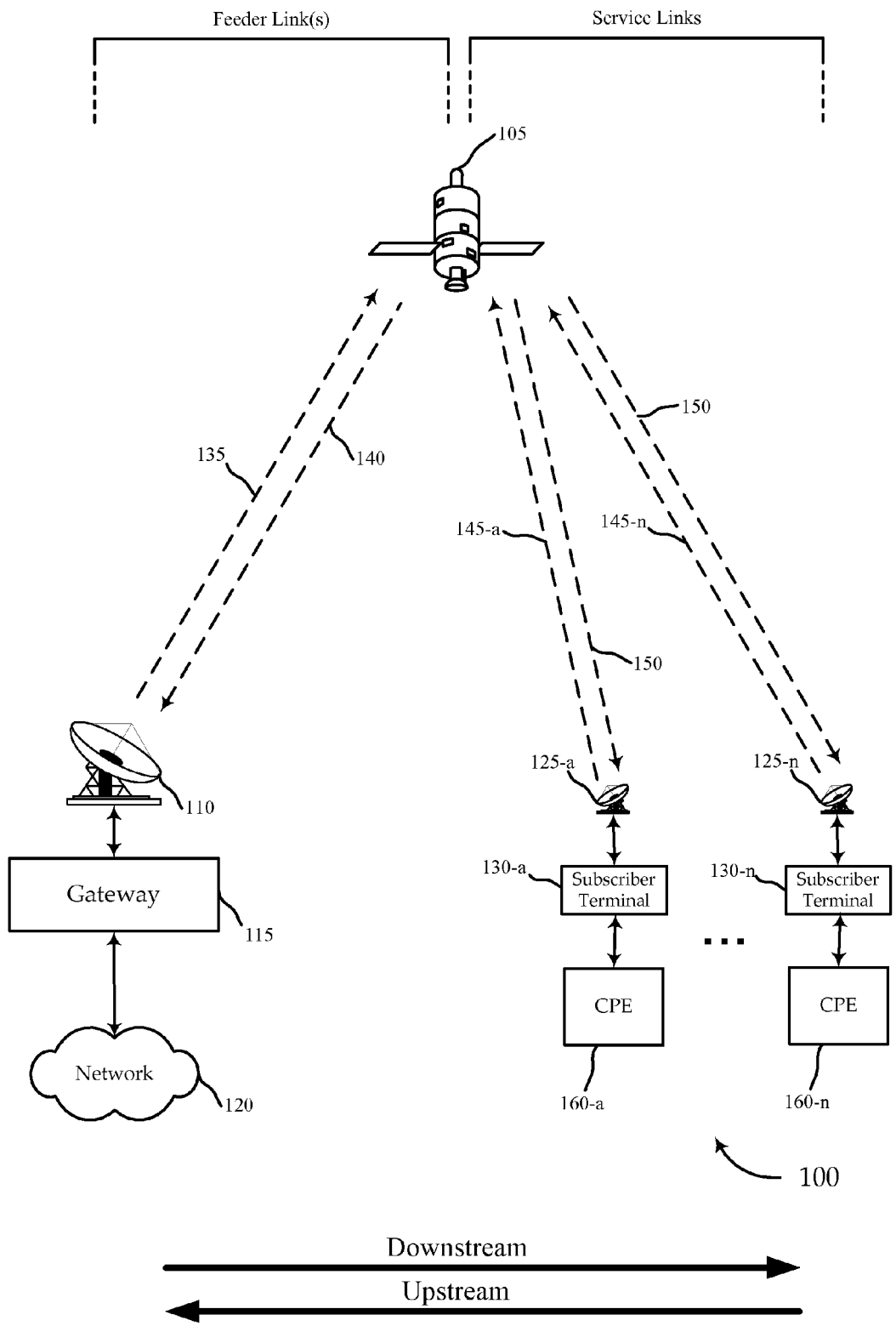
FIG. 1 illustrates a satellite communications system in which adaptive coding and modulation ("ACM") may be implemented according to various embodiments of the present invention.

Novel systems, methods, devices, and software are described to shape and control the data traffic in an ACM system. FIG. 1 is a block diagram illustrating an example satellite communications system 100 configured according to various embodiments of the invention. While a satellite communications system is used to illustrate various aspects of the invention, it is worth noting that certain principles set forth herein are applicable to a variety of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a local- or wide-area network, a virtual private network, the Public Switched Telephone Network ("PSTN"), or any other type of network supporting data communication between devices described herein, in different embodiments. A network 120 may include both wired and wireless connections, including optical links. The network 120 may also transmit information about link conditions for one or more subscriber terminals to the gateway 115. The network may connect the gateway 115 with other gateways (not pictured), which are also in communication with the satellite 105, and which may share information on link conditions and other network metrics.

The gateway 115 provides an interface between the network 120 and the subscriber terminal 130. The gateway 115 may be configured to receive data and information directed to one or more subscriber terminals 130, and can format the data and information (e.g., using ACM) for delivery to the respective destination terminal 130 via the satellite 105. Similarly, the gateway 115 may be configured to receive upstream signals from the satellite 105 (e.g., from one or more subscriber terminals) directed to a destination in the network 120, and can format the received signals for transmission along the network 120.

A device (not shown) connected to the network 120 may communicate with one or more subscriber terminals through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the novel traffic control and shaping techniques described herein to direct traffic to the individual terminals. The gateway 115 may use a broadcast signal, with a modulation and coding ("modcode") format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signals to the satellite 105. In one embodiment, the antenna 110 comprises a parabolic reflector with high directivity in the direction of the satellite and low directivity in other directions. The antenna 110 may be implemented in a variety of alternative configurations. The downstream signals may include, for example, a number of single carrier signals. Each signal carrier signal may be divided (e.g., using TDMA) into a number of virtual channels. The virtual channels may be the same size, or different sizes. In other embodiments, other channelization schemes may be used, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may process the signals received from the gateway 115 and forward the signal from the gateway 115 containing the MAC frame to one or more subscriber terminals 130. In one embodiment, the satellite 105 operates in a multi-beam mode, transmitting a number of narrow beams each directed at a different region of the earth, allowing for frequency re-use. This satellite 105 is configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals 150 transmitted from the satellite 105 may be received by one or more subscriber terminals 130, via the respective subscriber antenna 125. The subscriber terminals 130 may receive the signals from the satellite 105 under very diverse link conditions. In one embodiment, the antenna 125 and terminal 130 together comprise a very small aperture terminal (VSAT). In other embodiments, a variety of other types of antennas 125 may be used at the subscriber terminal 130 to receive a signal. Each of the subscriber terminals 130 may comprise a single user terminal or, alternatively, a hub or router (not pictured) that is coupled to multiple user terminals. Each subscriber terminal 130 may be connected to consumer premises equipment (CPE) 160 comprising, for example computers, local area networks, Internet appliances, wireless networks, etc.

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as FDMA, OFDMA, CDMA, or any number of hybrid or other schemes known in the art.

A subscriber terminal 130 may transmit information related to signal quality to the gateway 115 via the satellite 105. The signal quality may be a measured signal to noise ratio, an estimated signal to noise ratio, a bit error rate, a received power level, or any other communication link quality indicator. The subscriber terminal itself may measure or estimate the signal quality, or it may pass information measured or estimated by other devices. A subscriber terminal may also transmit data and information to a network 120 destination via the satellite 105 and gateway 115. The subscriber terminal 130 transmits the signals via the upstream uplink 145 to the satellite 105 using the antenna 125. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different.

Referring to FIG. 2A, an example of a modcode table 200 is illustrated in the form of a block diagram. This form of modcode table 200 may, for example, be used by a gateway 115 to determine the modcode to be used for packets destined for a subscriber terminal operating in a given signal quality range. The table contains a column listing a number of modcode formats 205. Each modcode format 205 corresponds to a specified signal quality range 210. Thus, using the signal quality attributed to a destination link for a packet, a signal quality range 210 encompassing the link may be identified, and the appropriate modcode may be selected. For example, if a destination link has a signal quality within Range 7, the modcode QPSK 3/4 may be used. In some embodiments, one or more of the ranges may include a reliability margin (which may be beneficial when channel conditions are changing rapidly, for example). One or more of the ranges may be modified dynamically to adjust this reliability margin as well.

In other embodiments, other signal quality indicators may be used, such as a measured signal to noise ratio, an estimated signal to noise ratio, a bit error rate, a received power level, or any other communication link quality indicator. It is also worth noting that a number of other data structures may also be used to relate signal quality ranges to modcodes. In one embodiment, each signal quality is associated with a different packet forwarding queue. In still other embodiments, other information density parameters in addition to modcode changes may be added to further adapt a signal to environmental or other conditions.

Turning to FIG. 2B, an example of an address/SNR table 250 is illustrated in the form of a block diagram. This form of address/SNR table 250 may, for example, be used by a gateway 115 to lookup the signal quality 260 of a subscriber terminal 130 to which a packet is destined, based on the destination address 255. The tables in FIGS. 2A and 2B may be embodied on one or more memories, which may be either on or off chip, and may be used in conjunction with one another to correlate a MAC address with a particular modcode format.

Although a destination MAC address is used in this example, other mechanisms may be used to identify particular subscriber terminals, including destination VLAN-ID, a Destination Internet Protocol ("DIP") address, a private addressing ID, any other set of data comprising or otherwise correlated with a destination address. The data address may be parsed from a received data packet after arrival at a device, or it may be received in any other manner known in the art. It is also worth noting that a number of other data structures may also be used to relate an address to signal quality.

Once a modcode for a particular packet or packets is identified, for example using the modcode table 200, it may then be encapsulated, coded, mapped and transmitted in a variety of ways, as known in the art. One way to implement ACM is via the DVB-S2 standard, which specifically provides for its use. As noted above, ACM may change the modulation format and Forward Error Correction (FEC) codes ("modcodes") to best match the current link conditions. This adaptation may occur on a frame by frame basis. The discussion that follows assumes an IP based packet network in the context of a DVB-S2 satellite transmission system, but the concepts may be applied for a variety of systems, including systems implementing DOCSIS or WiMax.

Figure 3:
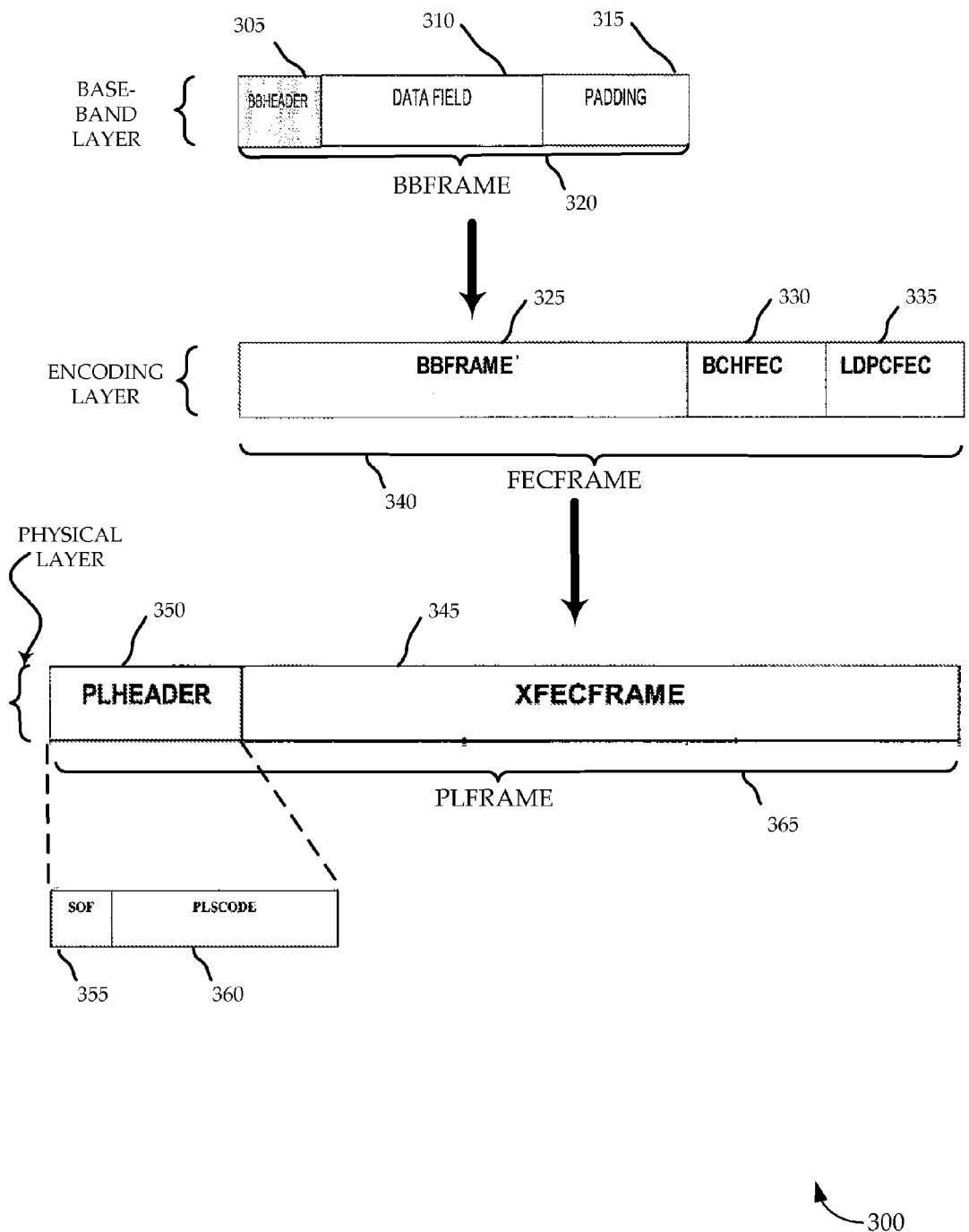
FIG. 3 is a simplified block diagram illustrating a DVB-S2 framing format that may be used to implement ACM according to various embodiments of the present invention.

Turning to FIG. 3, the framing format 300 for a frame of a DVB-S2 system is set forth to illustrate various aspects of the invention. In one embodiment, each frame is broadcast to all terminals 130, but is only directed at a select subscriber terminal 130 (or small groups of terminals 130). For example, the waveform may be a single carrier waveform transmitted downstream from a gateway 115 to a subscriber terminal 130 in the system 100 of FIG. 1. As noted above, while the DVB-S2 system is used as an example, the principles specified herein are applicable to a range of systems.

In this embodiment, a base-band frame 320 is made up of a base-band header 305, a data field 310, and padding 315. Data in the data field may include one or more IP packets encapsulated in a MAC frame, or may include other types of data as well. The data field may include addressing information (e.g., IP address, MAC address, etc.) indicating the terminal or terminals to which the packet will be directed. In some embodiments, IP packets associated with different modcodes may be transmitted in the same base-band frame 320, according to the lower order modcode. The DVB-S2 specification provides that certain frames will be of fixed size regardless of the modcode used (i.e., a normal FEC frame is 64,800 bits, and a shortened FEC frame is 16,200 bits). Therefore, instead of simply padding a frame when there is additional space available and no other remaining packets associated with a current modcode, a data packet (or fragment thereof) associated with a higher order modcode may be inserted into the base-band frame. In one embodiment, the available space is filled with as many additional data packets as will fit without overflow.

Interleaving and FEC encoding (e.g., BCH and LDCP) may then be performed on the base-band frame 320 to produce an encoded base-band frame 325, and outer coding parity bits 330 and inner coding parity bits 335 are appended to produce a FEC Frame 340. While, as noted above, the DVB-S2 specification provides that the FEC frame 340 will be of fixed size, in other embodiments, the FEC frame 340 size may vary according to the modcode selected for the frame, to thereby produce, for example, frames of uniform duration in time.

The FEC frame 340 is bit mapped to the applicable constellation (e.g., QPSK, 8PSK, 16APSK, 32APSK), to produce a XFEC frame 345 made up of symbols representative of the frame contents. A PL header 350 is added to the XFEC frame 345, together forming the PL frame 365. The PL header 350 is made up of a start of frame (SOF) slot 355 of 26 symbols, and a modcode (MODCOD) slot 360 of 64 symbols specifying the modcode and size (i.e., whether normal or shortened FEC frame). The PL header 350 is encoded. The PL frame 365 is then baseband shaped and quadrature modulated, as well as amplified and upconverted to be transmitted downstream.

Figure 4:
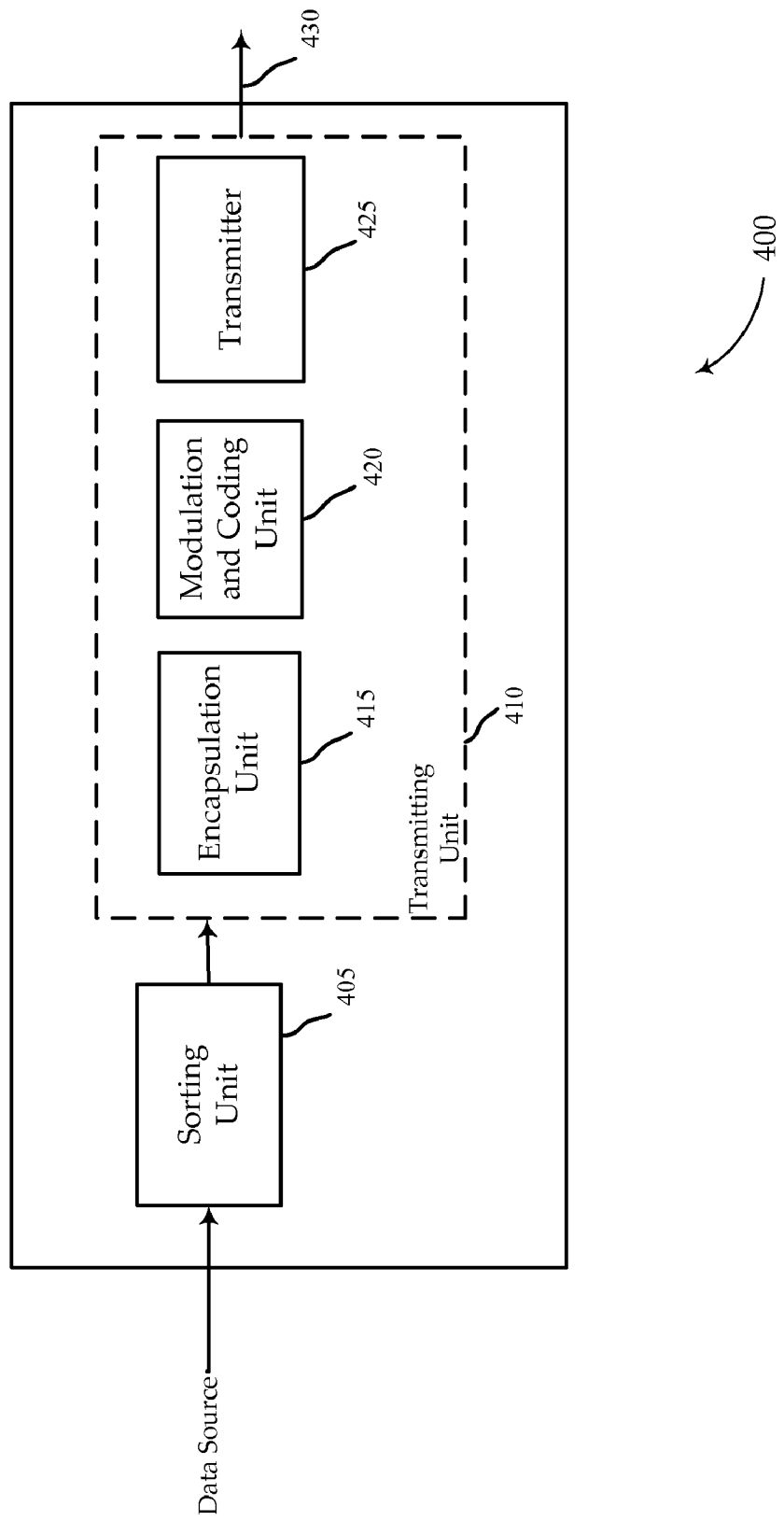
FIG. 4 is a simplified block diagram illustrating a communications device configured according to various embodiments of the present invention.

Referring to FIG. 4, a simplified block diagram illustrates an example of a device 400 configured according to various embodiments of the invention. In one embodiment, the device 400 is the gateway 115 of FIG. 1, transmitting packets downstream with modcodes adapted to the link to which the packets are directed. In other embodiments, the device 400 may be used in any number of different ACM implementations.

The device 400 in this embodiment includes a sorting unit 405 and a transmitting unit 410. In some embodiments, the transmitting unit 410 is made up of an encapsulation unit 415, a modulation and coding unit 420, and a transmitter 425. These components (405, 410, 415, 420, and 425) may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. Thus, the device 400 may include different types and configurations of memory (not shown), which may be integrated into the hardware or may be one or more separate components.

For purposes of discussion, assume that the device 400 is a gateway 115 within the system 100 of FIG. 1. In one embodiment, the system 100 is implemented in a star configuration where each terminal 130 communicates with the device 400, receiving a wide band broadcast signal and searching the waveform for data destined for that terminal 130. Each terminal 130 estimates the SNR of the received signal, although in other embodiments, different signal quality metrics may be used. This information is included in the return path, which may be established via a satellite link or some other means. In other embodiments, the device 400 may receive the link signal quality data from other sources as well. The device 400 then has an SNR estimate for each terminal (e.g., the address/SNR table 250 of FIG. 2B), and may organize this data on one or more memories, which may be implemented in hardware, in a separate computer readable medium, or external to the device 400.

Turning now to the packet flow, before being received by the device 400, a data packet may travel through a Class of Service/Quality of Service router (not shown), which may append several fields of information data packet. These fields may include the MAC address of the destination terminal, a counter field, and a time stamp field. Any of this functionality may be integrated into the device, as well.

The sorting unit 405 is configured to dynamically assign a different modcode to each data packet after each packet is received by the device. This assignment is based at least in part on a signal quality of a link to which the respective packet is destined. The sorting unit 405 is configured to use the MAC address, in conjunction with the SNR estimate, to identify a modcode to use to communicate with a terminal 130. To do so, the sorting unit 405 may produce or otherwise access a modcode table 200, or other mechanism which correlates certain SNR estimate ranges with different modcodes.

A transmitting unit 410, directly or indirectly connected with the sorting unit 405, is configured to transmit the sorted packets according to a defined order of progression, and to produce a broadcast signal output 430. In one embodiment, the defined order of progression comprises transmitting each received data packet associated with a first modcode (perhaps in sequence from oldest to youngest), before incrementing to a next higher order modcode and transmitting each received data packet associated with a next higher order modcode (perhaps in sequence from oldest to youngest), and incrementing accordingly to the highest order modcode. The process is then repeated beginning from the lowest order modcode. Note, however, that the term "defined order of progression" may include any packet forwarding selection or flow control algorithm known in the art. For example, a defined order of progression may encompass any of the number of queuing schemes that may order and format packets for forwarding based on modcode, destination address, order received, age, etc.

In one embodiment, the defined order of progression is interrupted upon expiration of a timer (hereinafter "interrupt timer"), and an out of order packet exceeding a threshold age is identified. The interrupt timer interval in one embodiment is 10 mS, but a variety of other intervals are possible. For each 10 mS time interval, several frames may be built, and the real time required to transmit these frames will be tracked. This may be accomplished by totaling the number of symbols required to transmit the physical layer frames. Once enough frames have been created such that more than 10 mS of time is required to transmit them, the timer expires. A number of other timer calculations are possible, as evident to those skilled in the art.

In one embodiment, the identified packet is the oldest received packet not yet transmitted (i.e., the threshold age is the age of the second oldest packet). The identified packet is then transmitted, and the defined order of progression may be restarted from the oldest packet. In another embodiment, all packets above a second threshold age are sent before the order of progression is restarted.

The device 400 may control other flow modifications when the identified oldest packet is above certain threshold ages. For example, if the identified packet exceeds a first threshold age (e.g., 50 mS), the sorting unit 405 may be further configured to allow data packets associated with a threshold quality or class of service to enter, while blocking others. If the identified packet exceeds a second threshold age (e.g., 80 mS), the sorting unit 405 may be further configured to block all incoming packets until another period of the timer expires. In another embodiment, the transmitting unit 410 is further configured to vary the period of the timer based at least in part on changes in the age of the identified oldest packet (e.g., decreasing the period of the timer if the age of the oldest packet increases). While these changes may be associated with the age of the oldest identified packet (e.g., measured by the difference between timestamp and transmission), other latency and traffic flow measurements may be used to modify these parameters.

In another embodiment, the sorting unit 405 is configured to vary a signal quality range associated with one or more modcodes to modify a reliability margin data for packets destined for a link within the varied signal quality range. For example, the sorting unit may be configured to increase the reliability margin when traffic is light, and decrease the reliability margin when traffic is heavy. This adjustment may, for example, be made based on the age of the oldest packet identified at the expiration of the timer (e.g., if T0>60 mS, set margin to 1 dB; if 60 mS>T0≧40 mS, set margin to 2 dB; if 40 mS>T0, set margin to 3 dB).

In some embodiments, the defined order of progression may include having the sorting unit 405 configured to group data packets associated with different modcodes for encapsulation in one frame to be transmitted according to a lowest order modcode of the different modcodes, the grouping to occur when there are no other remaining data packets that are associated with the lowest order modcode. For example, when there is additional space available in a base-band frame 320 and no other remaining packets are associated with a current modcode, a data packet (or fragment thereof) associated with a next higher order modcode may be inserted into the base-band frame 320.

To fill the additional space, a higher order packet may be fragmented, for example, into a first fragment and a second fragment. In such an embodiment, the first fragment may be sized to fill the available space, and transmitted in the first frame according to the lower order modcode. The second fragment may then be transmitted in a following frame according to the higher modcode.

In such embodiments, the transmitting unit 410 may include an encapsulation unit 415. The encapsulation unit 415 may be configured to encapsulate in a frame (e.g., a single base-band frame 320) one or more packets associated with a lower order modcode and one or more additional packets associated with a higher order modcode. The transmitting unit 410 also includes a modulation and coding unit 420 configured to encode and map the frame according to the lower order modcode (e.g., to produce XFEC frame 345). A transmitter 425 may baseband shape and quadrature modulate the frame, as well as amplify and upconvert the signal, to produce a broadcast signal output 430.

Figure 5:
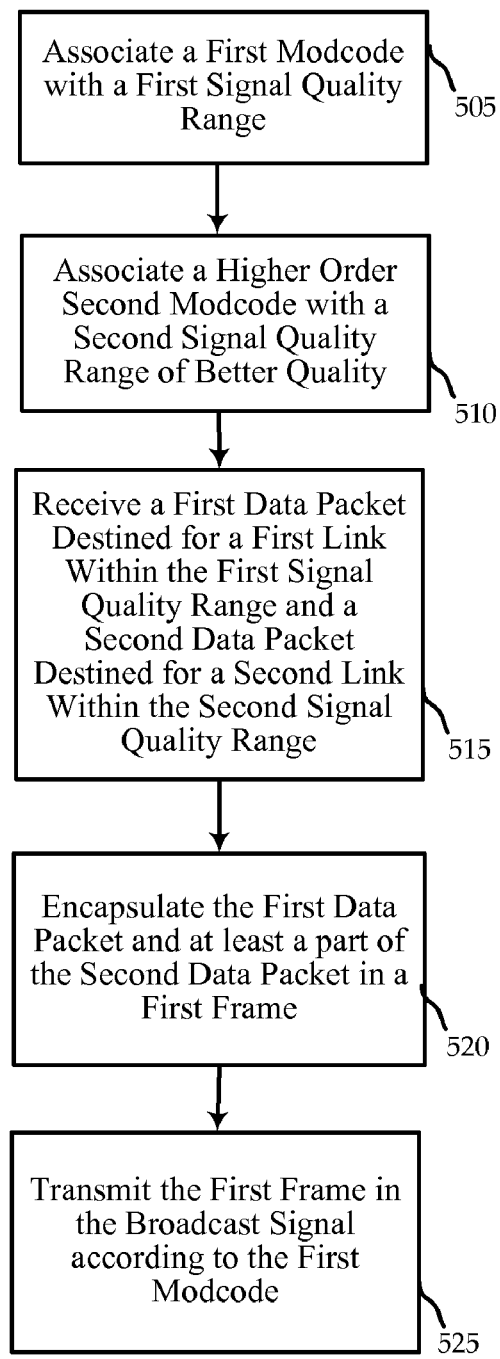
FIG. 5 is a flowchart illustrating a packet encapsulation and transmission format according to various embodiments of the present invention.

FIG. 5 is a flowchart illustrating a process 500 of implementing adaptive coding and modulation in a broadcast signal. The process may be performed, for example, in whole or in part by the device 400 of FIG. 4. At block 505, a first modcode is associated with a first signal quality range. At block 510, a higher order second modcode is associated with a second signal quality range of better quality.

At block 515, a first data packet destined for a first link within the first signal quality range and a second data packet destined for a second link within the second signal quality range are received. At block 520, the first data packet and at least a part of the second data packet are encapsulated in a single frame. At block 525, the first frame is transmitted in the broadcast signal according to the first modcode.

Figure 6:
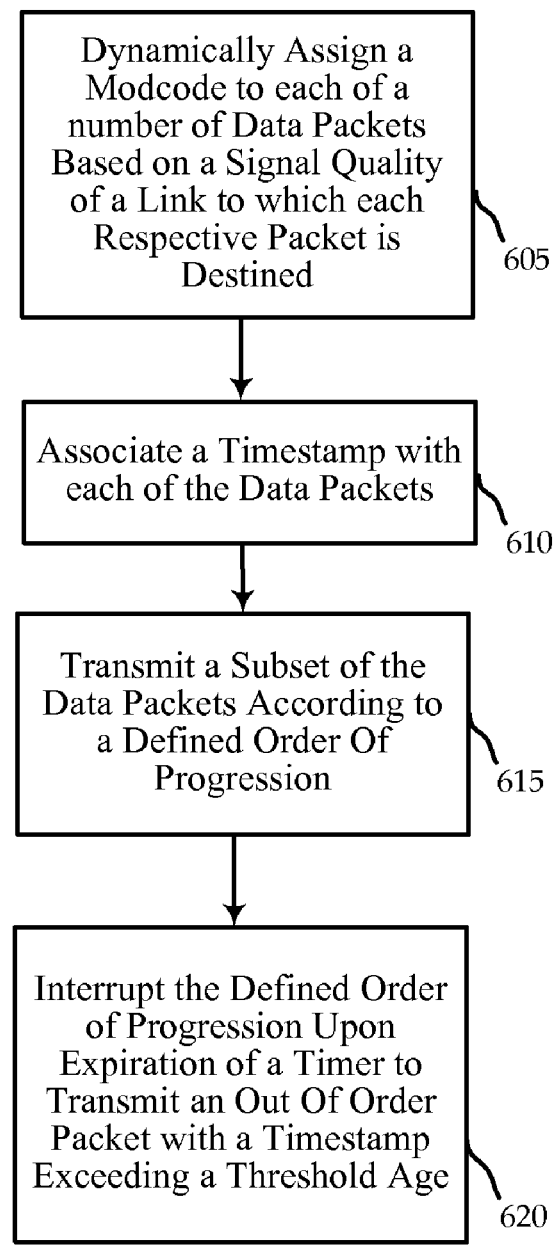
FIG. 6 is a flowchart illustrating a flow control process for packet transmission according to various embodiments of the present invention.

FIG. 6 is a flowchart illustrating a process 600 for controlling the flow of data traffic in a broadcast signal implementing adaptive coding and modulation. The process may be performed, for example, in whole or in part by the device 400 of FIG. 4. At block 605, a modcode is dynamically assigned to each of a number of data packets based on a signal quality of a link to which each respective packet is destined. At block 610, each data packet is associated with a timestamp. At block 615, some of the received data packets are transmitted according to a defined order of progression. At block 620, the defined order of progression is interrupted upon expiration of a timer, and an out of order packet is transmitted with a timestamp exceeding a threshold age.

Figure 7:
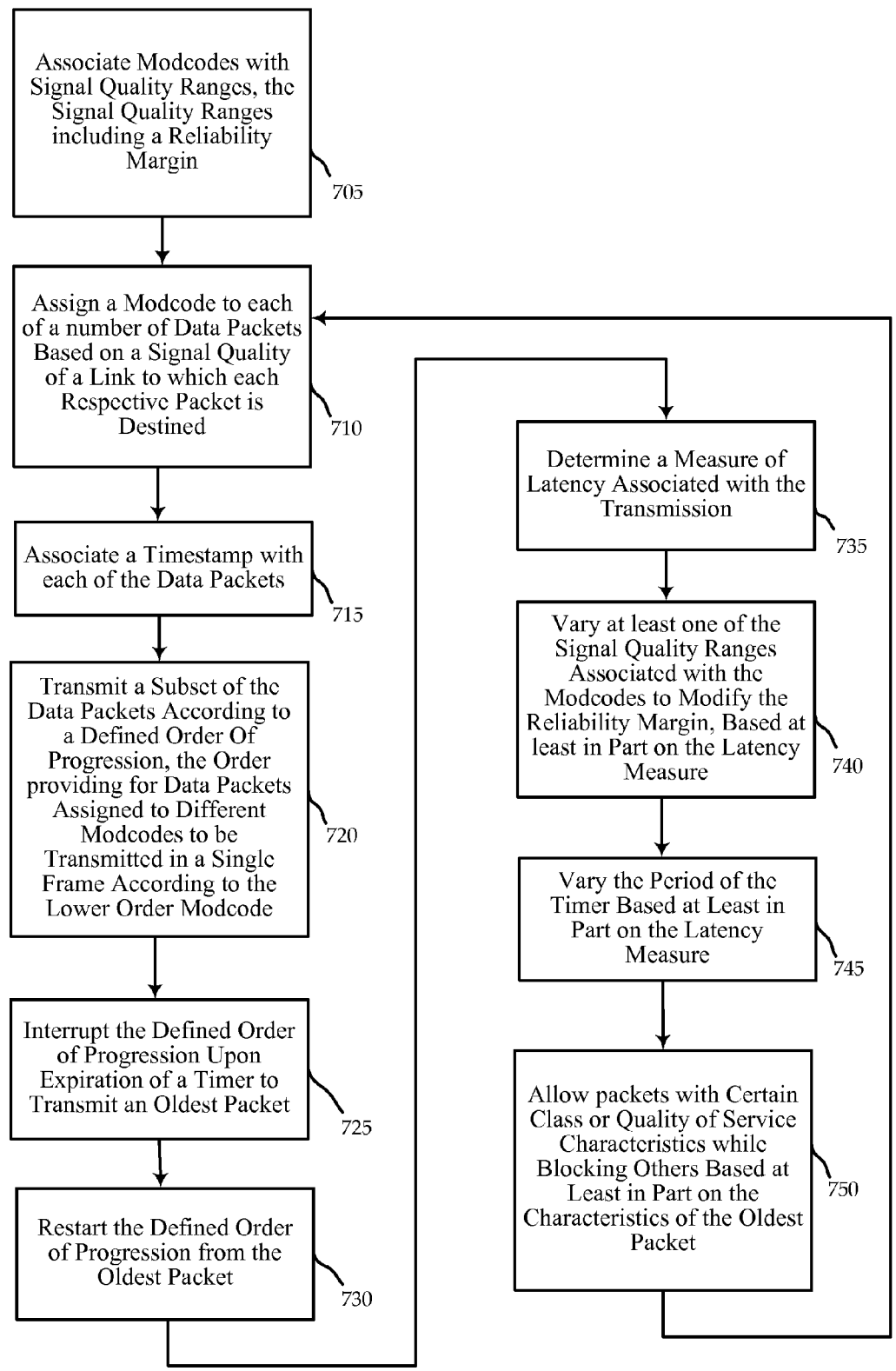
FIG. 7 is a flowchart illustrating a flow control and packet encapsulation process according to various embodiments of the present invention.

FIG. 7 is a flowchart illustrating a process 700 for controlling the flow of data traffic in a broadcast signal implementing adaptive coding and modulation. The process may be performed, for example, in whole or in part by the device 400 of FIG. 4. At block 705, various modcodes are each associated with different signal quality ranges, the signal quality ranges including a reliability margin. At block 710, a modcode is assigned to each of a number of data packets based on a signal quality of a link to which each respective packet is destined. At block 715, a timestamp is associated with each of the data packets.

At block 720, some of the data packets are transmitted according to a defined order of progression, the order providing for data packets assigned to different modcodes to be transmitted in a single frame according to the lower order modcode. At block 725, upon expiration of a timer, the defined order of progression is interrupted to transmit an oldest packet. At block 730, the defined order of progression is restarted from the oldest packet.

At block 735, a measure of latency associated with the transmission is determined (e.g., based on the age of the transmitted oldest packet, or using other latency or flow characteristics). At block 740, at least one of the signal quality ranges associated with the modcodes are varied to modify the reliability margin, the varying based at least in part on the latency measure. At block 745, the period of the timer is varied based at least in part on the latency measure. At block 750, only packets with certain class or quality of service characteristics are allowed, while others are blocked, based at least in part on the characteristics of the oldest packet. The process may then be restarted from block 710.

Figure 8:
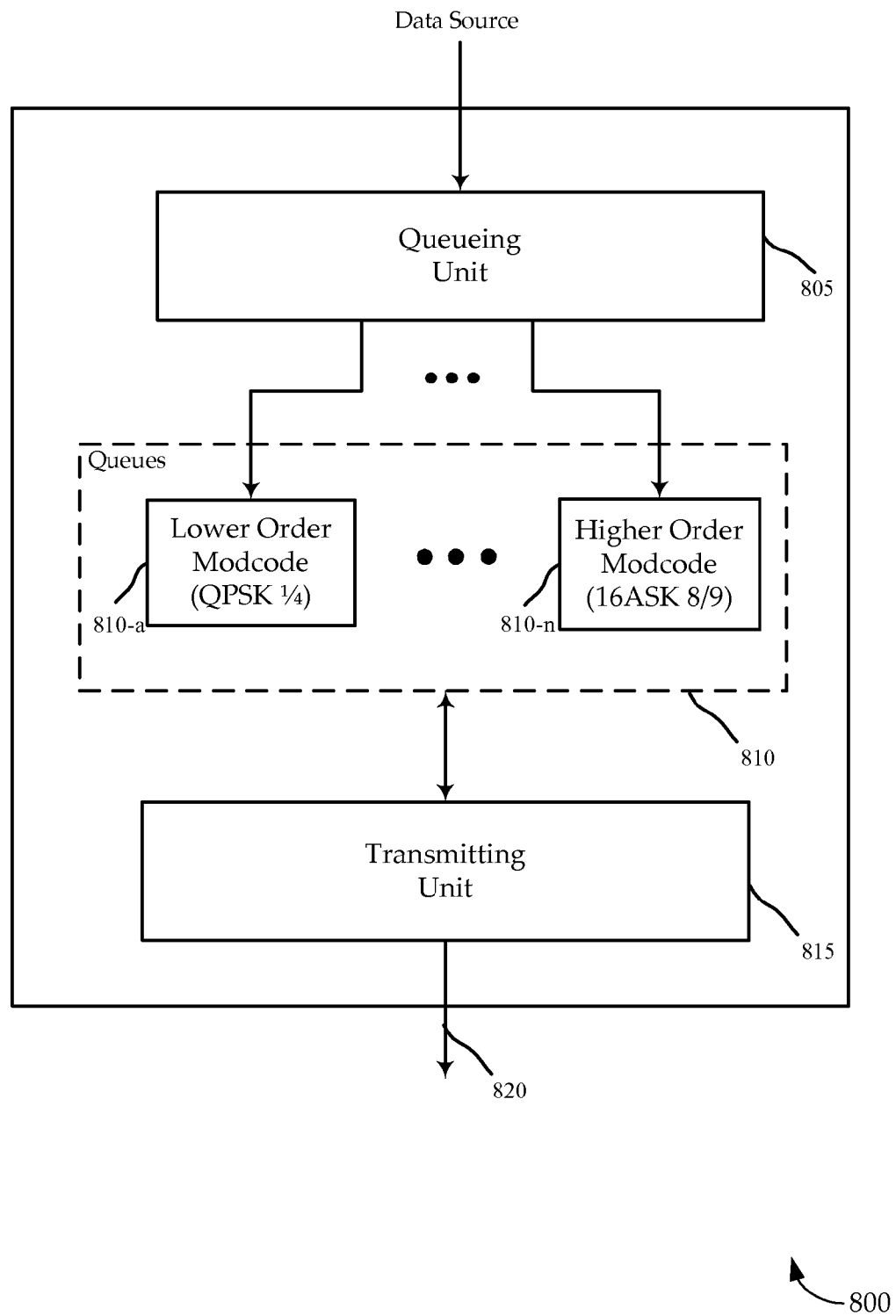
FIG. 8 is a simplified block diagram illustrating a device including a queuing unit configured according to various embodiments of the present invention.

Referring next to FIG. 8, a simplified block diagram illustrates an example of a queuing device 800 configured to queue and transmit packets according to their modcode. The queuing device 800, in one embodiment, may be the device 400 described in relation to FIG. 4, implementing adaptive modulation and coding utilizing the queuing process described below.

The device 800 in this embodiment includes a queuing unit 805, a number of packet forwarding queues 810, and a transmitting unit 815. These components (805, 810, and 815) may be in communication with one another, and may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. The queues 810 may be embodied on one or more memories, which may be either on or off chip.

For purposes of discussion, assume that the device 800 is a gateway 115 within the system 100 of FIG. 1. However, note that in other embodiments, the device 800 may be used in any number of different ACM implementations. In one embodiment, the system 100 is implemented in a star configuration where each terminal 130 communicates with the device 800, receiving a wide band broadcast signal and searching the waveform for data destined for that terminal 130. Each terminal 130 may estimate the signal quality of the service link using any one of a variety of metrics, and transmit the estimate to the queuing device via the return path. In other embodiments the device 800 may receive the link signal quality data from other sources as well. The device 800 then has a receive signal estimate for each terminal (e.g., the address/SNR table 250 of FIG. 2B), and may organize this data on one or more memories, which may be implemented in hardware, in a separate computer readable medium, or external to the device 800.

Turning now to the packet flow, a data packet from a data source may be received by the queuing device 800. The queuing device 800 includes a number of individual packet forwarding queues 810, each assigned a different modcode and associated with a select one of a number of signal quality ranges. After entering the device, each respective packet is received by a queuing unit 805 configured to place the packet into a select one of the packet forwarding queues 810. The particular queue selected is based on its association with a signal quality range encompassing a signal quality of a link to which the respective packet is destined. To make this assignment, the queuing unit 805 may produce or otherwise access a modcode table 200, or other mechanisms which correlate certain signal quality estimate ranges with different modcodes. By queuing packets as they arrive, the queuing unit 805 is able to order the packets in the queues 810 from oldest to youngest. Thus, the queues 810 may be FIFO buffers, so the packets in each queue are in time order. (It is worth noting that in some embodiments, the sorting unit 405 of FIG. 4 may be implemented as the queuing unit 805 of FIG. 8).

A transmitting unit 815, directly or indirectly connected with the packet forwarding queues 810, is configured to transmit the packets according to a defined order of progression, and to produce a broadcast signal output 820. In one embodiment, the defined order of progression comprises transmitting each received data packet in a given forwarding queue associated with a first modcode (e.g., in sequence from oldest to youngest), before incrementing to the queue 810 associated with the next higher order modcode and transmitting each received data packet associated with a next higher order modcode (again, perhaps in sequence from oldest to youngest), and incrementing accordingly to the queue 810 with the highest order modcode. Once the queue with the highest order modcode is emptied, the process is then repeated beginning from the queue 810 associated with the lowest order modcode. Note that in one embodiment, the defined order of progression may provide for transmitting at least one data packet from a first selected queue and a data packet or fragment from a second selected queue in a single frame according to lower order modcode. For example, when there is additional space available in a base-band frame 320 and no other remaining packets are associated with a current modcode, a data packet (or fragment thereof) associated with a next higher order modcode may be inserted into the baseband frame 320. Note, also, that the term "defined order of progression" may include any of a number of queuing schemes that may order and format packets for forwarding based on modcode, destination address, order received, age, etc.

The defined order of progression is interrupted upon expiration of a timer (hereinafter "interrupt timer"), and a packet exceeding a threshold age and from an out of order queue 810 is identified. In one embodiment, the identified packet is the oldest received packet not yet transmitted (i.e., the threshold age is the second oldest packet). The identified packet is then transmitted, and the defined order of progression may be restarted from the transmitted packet. Note that in one embodiment, the defined order of progression may provide for transmitting at least one data packet from the first selected queue and the data packet from the second selected queue in a single frame according to the first modcode Turning to FIG. 9, an alternative embodiment of the queuing device 800 is illustrated, including additional component functionality from that described with respect to FIG. 8. In this embodiment, before being received by the device 400, a data packet may travel from the data source through a Class of Service/Quality of Service router 930, which may append the class or quality of service information field and an address field identifying the destination terminal.

From the QoS/CoS Router, a data packet may be transmitted to the queuing device 805. In addition to the functionality described above, the queuing unit 805 in this embodiment may include a timestamp 905 unit, a counter 910, a filtering unit 915, and a margin unit 920. The queuing device 800 may utilize these components to control certain flow modifications. The timestamp 905 unit may be used to append or otherwise associate a timestamp to a packet when it is received by the device, or at other processing stages. The timestamp may, therefore, be used to determine the "age" of given packet. The timestamp may be used by other components of the queuing device 800 to determine latency associated with a particular packet or packets at different stages of processing (i.e., latency from receipt at the device 800 to transmission, latency within the queuing unit, etc.).

The queuing unit 805 may make use of the timestamp in a number of ways. For example, consider an interruption of the defined order of progression to identify an out of order packet. If age (determined through use of the timestamp 905 unit) of the identified packet exceeds a first threshold age (e.g., 60 mS), the filtering unit 915 may be configured to allow data packets associated with a threshold quality or class of service to enter, while blocking others. If the identified packet exceeds a second threshold age (e.g., 90 mS), the filtering unit 915 may be further configured to block all incoming packets until another period of the timer expires.

In one embodiment, the queuing unit 805 includes a margin unit 920 configured to vary a signal quality range associated with one or more queues. The margin unit 920 may vary the signal quality range of a queue to modify a reliability margin for data packets destined for a link within the varied signal quality range. By way of example, the margin unit 920 may be configured to increase the minimum signal quality of a range when traffic is light, and decrease the minimum signal quality of a range when traffic is heavy. This adjustment may, for example, be made based on the age of the packet identified at the expiration of the timer 925.

In one embodiment, the queuing unit utilizes a counter 910 to associate an order with the data packets, perhaps on a per destination address basis. The transmitting unit 815 may be configured to hold transmission of a data packet when the packet is out of the order specified by the counter.

As noted above, according to one set of embodiments, the defined order of progression is interrupted upon expiration of a timer, and a packet exceeding a threshold age, and from an out of order queue 810, is identified. The timer may be located on, or off the device. In one embodiment, an on-device timer 925 is located in the transmitting unit 815. The transmitting unit 815 may be configured to vary the period of the timer based at least in part on the latency measure or a data flow measure (e.g., decreasing the period of the timer if the age of packets and the data flow through the device 800 increase). While these changes may be associated with the age of the packet identified from the out of order queue, other latency and traffic flow measurements may be used to modify these parameters (e.g., filtering unit 915 parameters, margin unit 920 parameters, or period of the timer 925).

Figure 9:
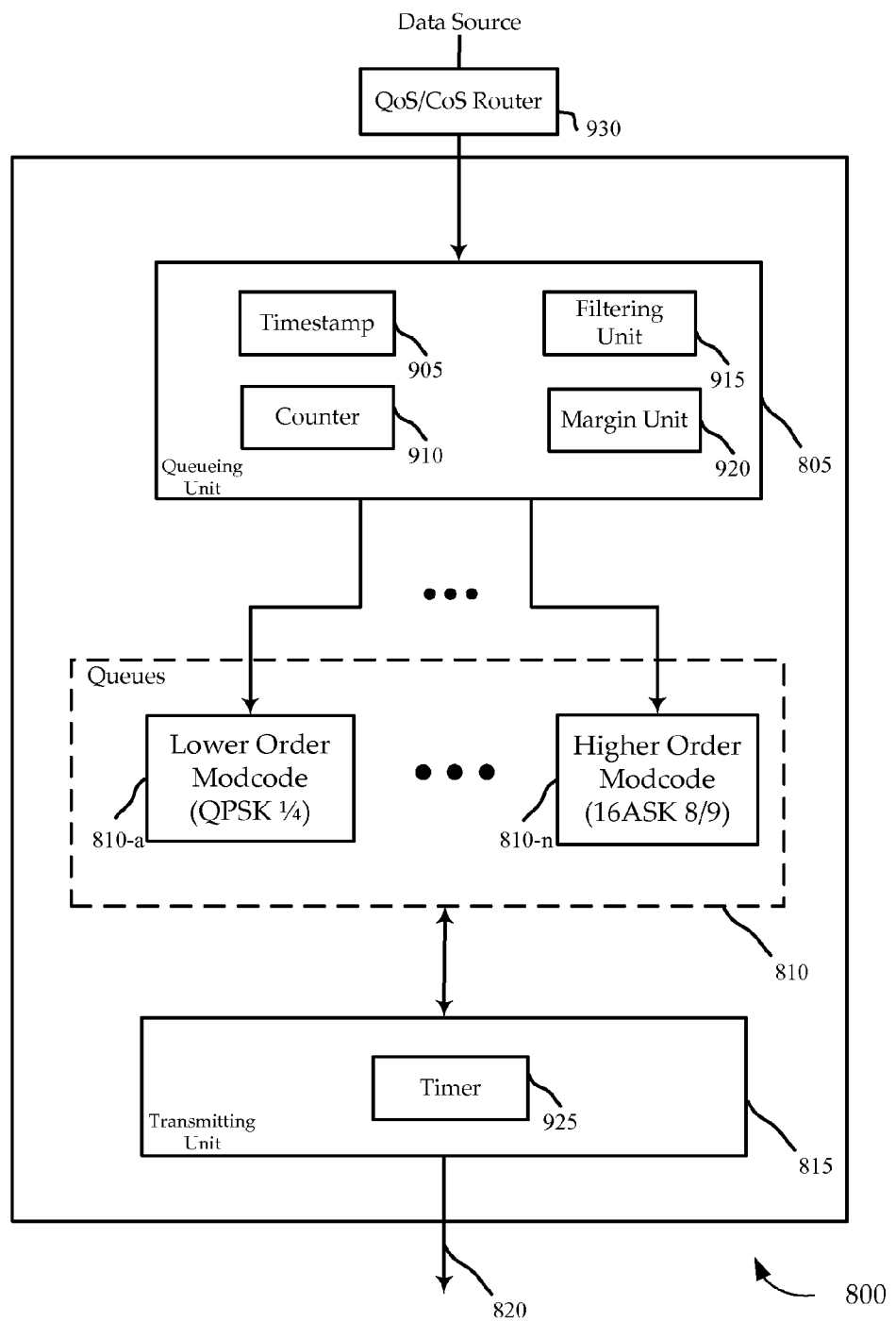
FIG. 9 is a simplified block diagram illustrating an alternative communications device including a queuing unit configured according to various embodiments of the present invention.
Figure 10:
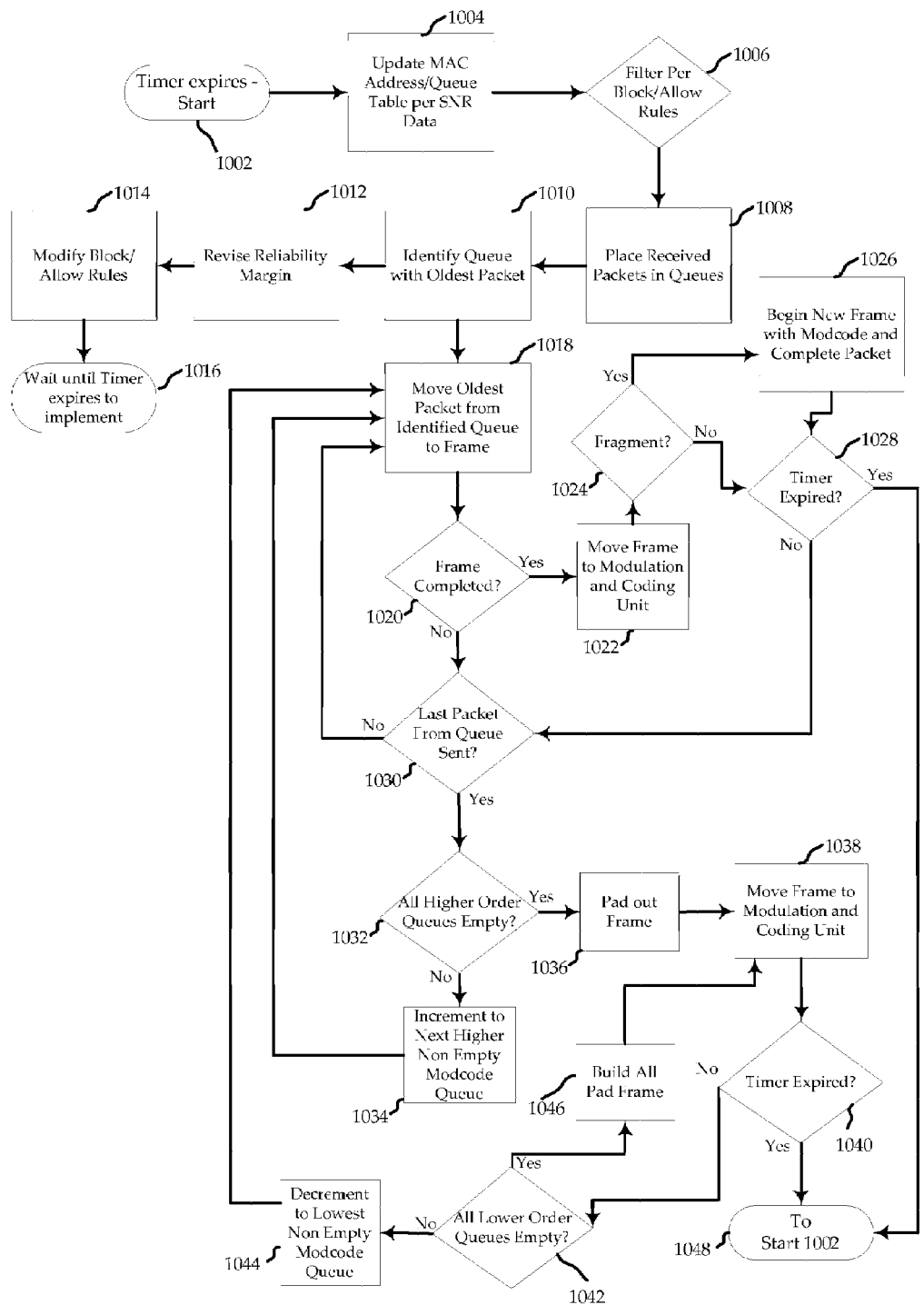
FIG. 10 is a flow diagram illustrating a queuing process according to various embodiments of the present invention.

Turning to FIG. 10, a flow diagram illustrates an example decision flow 1000 for a device, such as the queuing device 800 of FIG. 8 or 9. At block 1002, assume that the process begins upon the expiration of a timer, such as the timer 925 in the transmitting unit 820 of FIG. 9. The timer then restarts. In this embodiment, there is a table in which MAC addresses of the destination terminals are associated with the queues 810 (e.g., by using the tables 200, 250). At block 1004, these tables are updated with revised SNR information from the terminals. Incoming data packets are filtered at block 1006 according to blocking rules based on latency measurements, and these rules may, for example, be implemented by the filtering unit 915. At block 1008, allowed packets are placed into respective queues 810, based on the destination terminal SNR and the signal ranges applicable to the queues 810. The queue 810 with the oldest packet, and the age of that packet, are identified at block 1010. These first blocks in FIG. 10 (1002, 1004, 1006, 1008, 1010) may be initiated together at on or about the same time.

The reliability margin calculations for each modcode queue 810 may then be revised, at block 1012, based on the age of the oldest packet. Also, the blocking rules may be modified, at block 1014, also based on the age of the oldest packet. These revisions will be implemented, at block 1016, upon the expiration of the timer. In other embodiments, the period of the timer may be modified based on the age of the oldest packet, as well.

At block 1018, the oldest packet (or fragment thereof) is moved from the identified queue 810 to the payload portion of a frame, for example, a base-band frame 320 for the DVB-S2 system. At block 1020, a determination is made as to whether the frame is completed (e.g., a determination that there is no available space left in the frame). If the frame is complete, the frame is encapsulated and forwarded to the modulation and coding unit at block 1022, where it is encoded and mapped accordingly. At block 1024, a determination is made whether the frame includes a beginning of a fragment. If so, block 1026 indicates that the next frame will begin with the remaining portion of the fragment to complete the packet (regardless of whether the timer expires in the interim). At block 1028, a determination is made whether the timer has expired. If yes, at block 1048 the process 1000 is restarted, back to block 1002.

Returning to block 1020, if the determination is made that the frame is not complete, the frame may continue to be filled. Similarly, if the timer has not expired at block 1028, a new frame may be constructed. In each case, a determination is made at block 1030 regarding whether the last packet from a current queue 810 has been sent. If packets remain in the current queue 810, the process returns to block 1018 to move the oldest packet from the current queue 810 to fill (or begin) the frame. However, if it is determined that no packets remain in the current queue 810, a frame may still be filled or constructed with a packet from a queue associated with a higher order queue.

Thus, at block 1032, a determination is made whether all higher order queues are empty. If not, a current queue identifier increments, at block 1034, to the next highest non-empty queue 810, and then returns to block 1018 to move the oldest packet from the newly identified queue 810 to fill (or begin) the frame. When a frame is eventually completed and forwarded to the modulation and coding unit at block 1022, and packets associated with different modcodes are in a single frame, the lowest order modcode associated with the packets of the frame is used. It will be evident to those skilled in the art how the process described may empty queues 810 to construct and fill frames, incrementing to next higher order non-empty queues 810 as current queues 810 are emptied.

Returning to block 1032, if it is determined that there are no higher order queues with packets remaining, the frame is padded at block 1036 (e.g., with the padding 315 of a DVB-S2 base-band frame 320). The frame is encapsulated and forwarded to the modulation and coding unit at block 1038, where it is encoded and mapped accordingly. At block 1040, a determination is made whether the timer has expired. If yes, the process 1000 is restarted at block 1048. If the timer has not expired, at block 1042 a determination is made whether all lower order queues are empty. If not, the process decrements, at block 1044, to the lowest order non-empty queue 810, and then returns to block 1018 to move the oldest packet from that queue 810 to begin the next frame, with the process repeating in the manner described above from block 1018.

Returning to block 1042, if the determination is that all lower order queues are empty, an all pad frame is built at block 1046. The process returns to block 1038, where the all pad frame is encapsulated and forwarded to the modulation and coding unit, where it is encoded and mapped accordingly, and the process continues from there.

Figure 11:
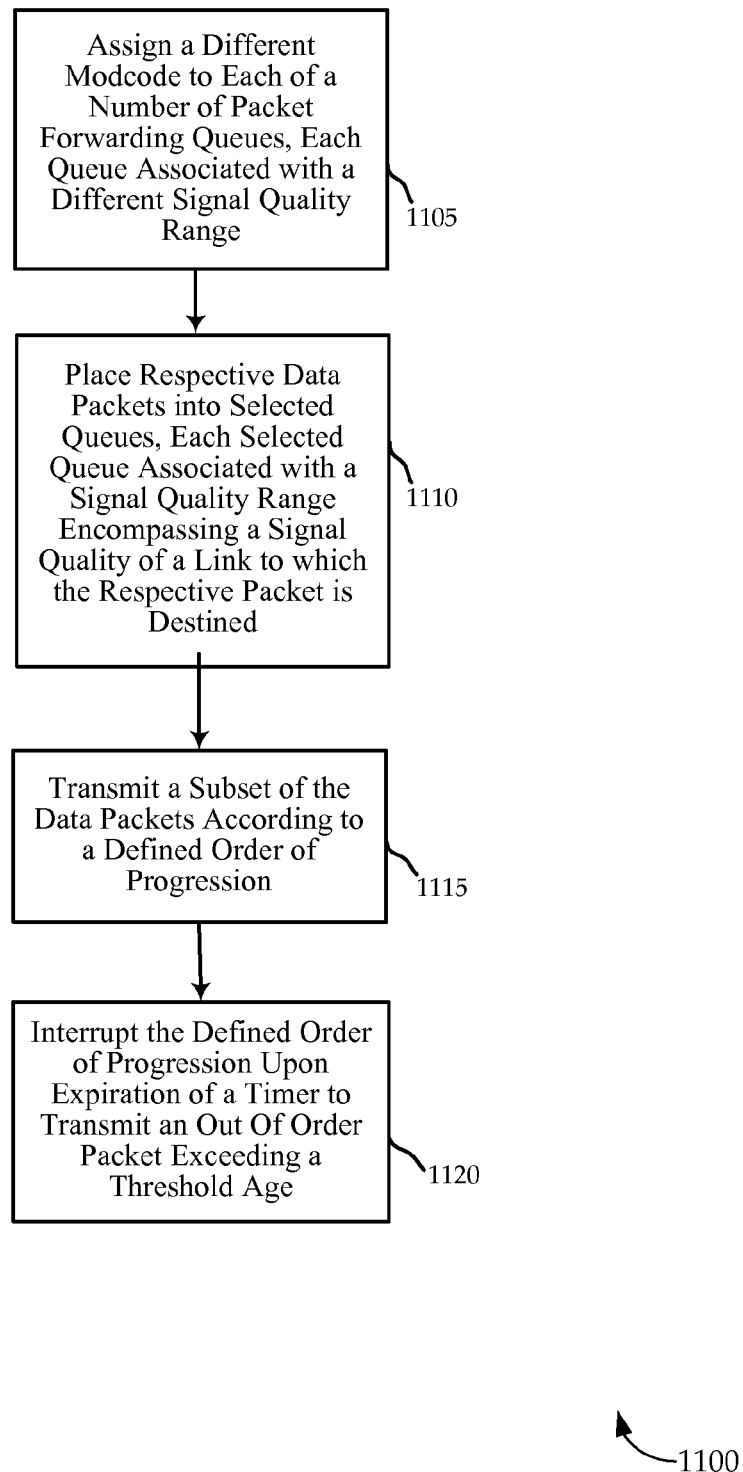
FIG. 11 is a flowchart illustrating a flow control queuing process for packet transmission according to various embodiments of the present invention.

FIG. 11 is a flowchart illustrating a process 1100 for controlling the flow of data traffic implementing adaptive coding and modulation using packet forwarding queues. The process may be performed, for example, in whole or in part by the device 800 of FIG. 8 or 9. At block 1105, a different modcode is assigned to each of a number of packet forwarding queues, each queue associated with a different signal quality range. At block 1110, received data packets are each placed into selected queues, the selected queue associated with a signal quality range encompassing the signal quality of a link to which the respective packet is destined. At block 1115, at least some of the data packets are transmitted according to a defined order of progression. At block 1120, the defined order of progression is restarted upon expiration of a timer to identify, and transmit, an out of order packet exceeding a threshold age. In one set of embodiments, this identified packet is the oldest packet remaining in the queues.

Figure 12:
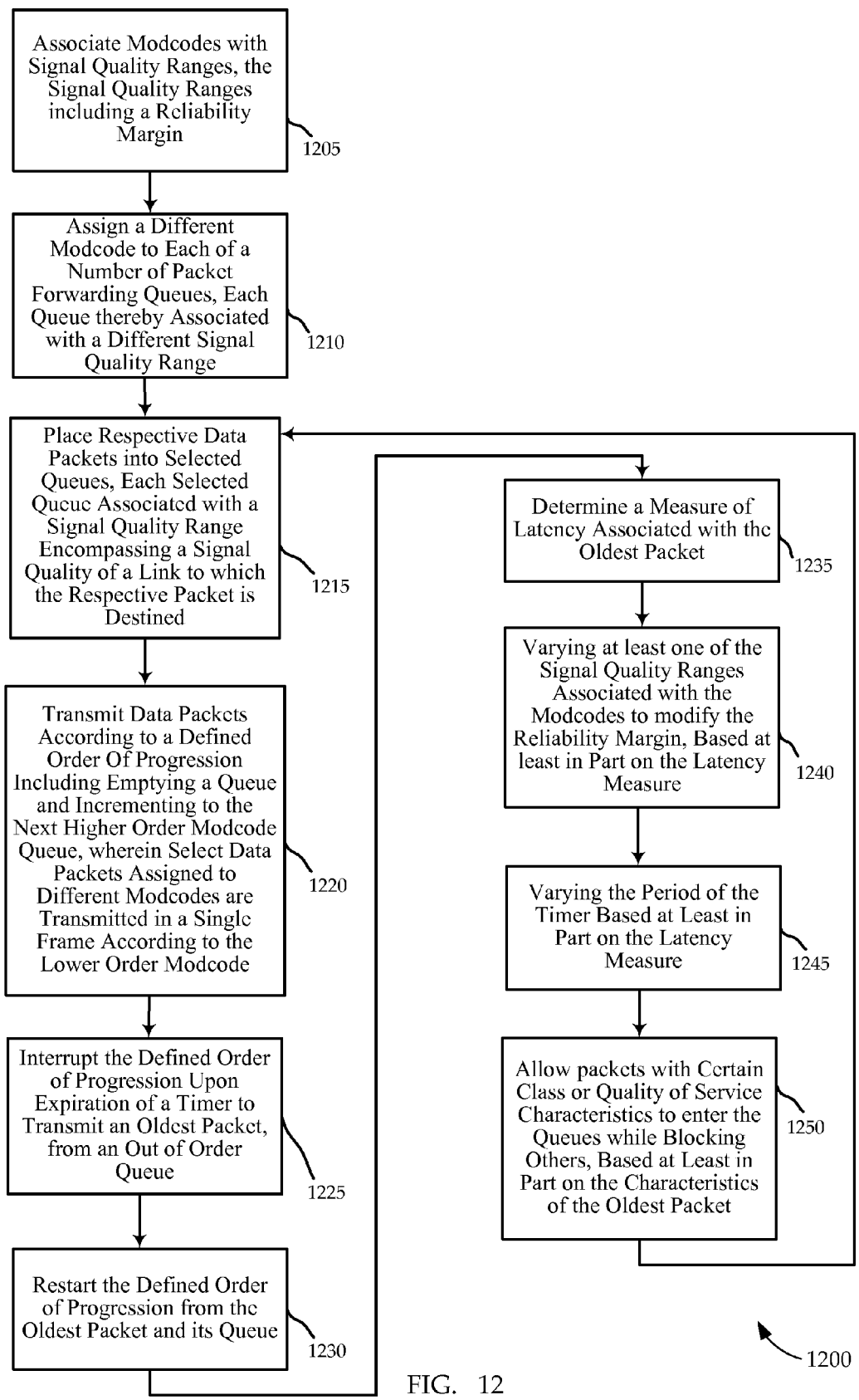
FIG. 12 is flowchart illustrating an alternative flow control queuing process for packet transmission according to various embodiments of the present invention.

Turning to FIG. 12, a flowchart is shown which illustrates an alternative process 1200 for controlling the flow of data traffic using packet forwarding queues to implement adaptive coding and modulation. The process may be performed, for example, in whole or in part by the device 800 of FIG. 8 or 9. At block 1205, modcodes are each associated with a signal quality range, the signal quality range including a reliability margin. At block 1210, the modcodes are each assigned to one of a number of packet forwarding queues, each queue thereby associated with a different signal quality range.

At block 1215, respective data packets are each placed into selected queues, the selected queue for each packet being the queue associated with a signal quality range encompassing the signal quality of a link to which the respective packet is destined. At block 1220, data packets are transmitted according to a defined order of progression, the order including emptying a queue and incrementing to the next higher order modcode queue, wherein select data packets assigned to different modcodes are transmitted in a single frame according to the lower order modcode. At block 1225, the defined order of progression is interrupted upon the expiration of a timer to identify and transmit the oldest packet in the queues, from an out of order queue. The defined order of progression is then restarted, at block 1230, from the oldest packet and its queue.

At block 1235, a measure of latency associated with the oldest packet is determined. At block 1240, at least one of the signal quality ranges associated with the modcodes are varied to modify the reliability margin, based at least in part on the latency measure. The period of the timer is also varied, at block 1245, based at least in part on the latency measure. At block 1250, packets with certain class or quality of service characteristics are allowed to enter the queues while others are blocked, this filtering based at least in part on the characteristics of the oldest packet (e.g., via the latency measure).

Figure 13:
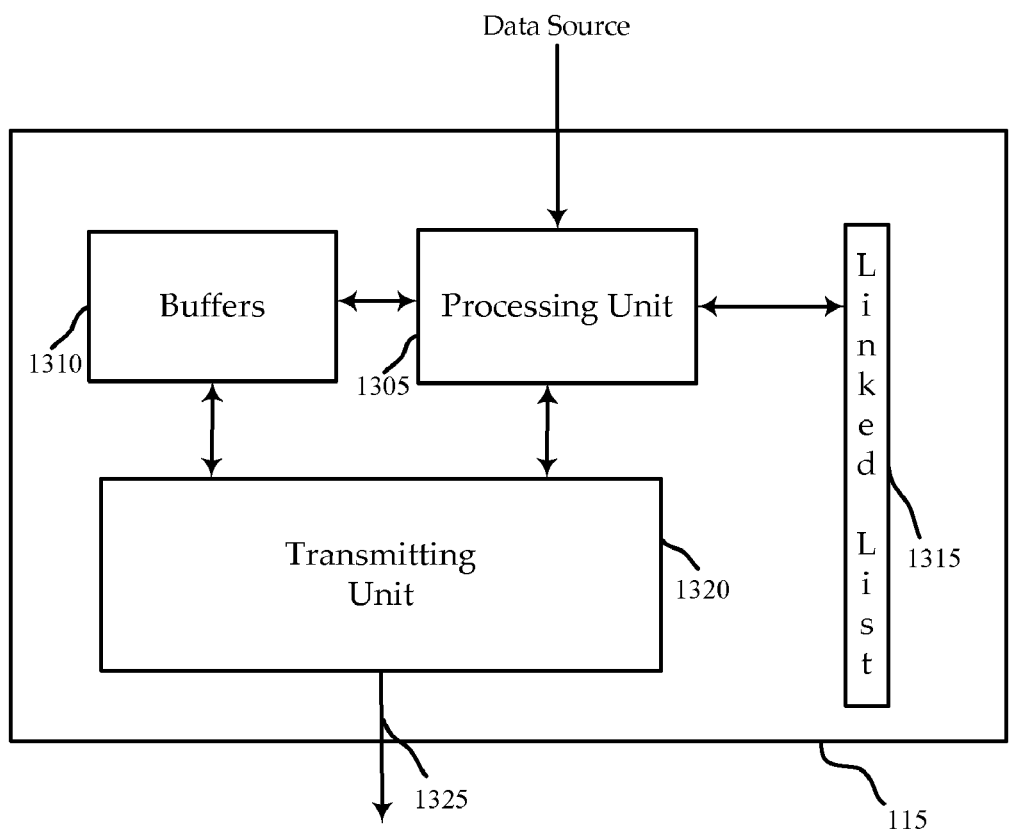
FIG. 13 is a simplified block diagram illustrating a communications device configured to use a linked list according to various embodiments of the present invention.

While FIGS. 8-12 illustrate a set of embodiments in which packet forwarding queues are used to implement various aspects of the invention, certain principles set forth may be applied using a variety of alternative data structures. Referring next to FIG. 13, a simplified block diagram illustrates an example of a traffic shaping device 1300 configured to utilize a linked list data structure to shape and control data traffic according to modcode in an ACM system. The traffic shaping device 1300, in one embodiment, may be the device 400 described in relation to FIG. 4, implementing adaptive modulation and coding utilizing a linked list in the manner described below.

The device 1300 in this embodiment includes a processing unit 1305, buffers 1310, a linked list 1315, and a transmitting unit 1320. These components (1305, 1310, 1315, and 1320) may be in communication with one another, and may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. The buffers 1310 and linked list 1315 may be embodied on one or more memories, which may be either on or off chip.

For purposes of discussion, assume that the device 1300 is a gateway 115 within the system 100 of FIG. 1. However note that in other embodiments, the device 1300 may be used in any number of different ACM implementations. As noted in regard to other embodiments, each terminal 130 may measure the signal quality of the service link using any one of a variety metrics, and transmit the measurement to the traffic shaping device 1300 via the return path. In other embodiments the device 1300 may receive the link signal quality data from other sources as well. The traffic shaping device 1300 may then have a receive signal measurement from each terminal (e.g., the address/SNR table 250 of FIG. 2B), and may organize this data on one or more memories, which may be implemented in hardware, in a separate computer readable medium, or external to the device 1300.

Turning now to the packet flow, before being received by the device 1300, a data packet may travel from a data source through a Class of Service/Quality of Service router (not shown), which may append several fields of information data packet. These fields may include the QoS/CoS information for the packet, address information of the destination terminal, a counter field, and a time stamp field. Any of this functionality may be integrated into the device 1300, as well.

Upon being received by the traffic shaping device 1300 from a data source, the processing unit 1305 may store received data packets (and any appended data) in the buffers 1310. The processing unit 1305 also inserts a new element associated with the buffered data packet in a linked list 1315, which will be used to shape the traffic as it is transmitted from the device 1300. In one embodiment, the sorting unit 405 of FIG. 4 is the processing unit 1305 of FIG. 13.

The linked list may be structured in a variety of ways, as known in the art, and the following explanation illustrates only a subset of the implementations possible. In one embodiment, the linked list may be characterized as a data structure made up of a sequence of elements, each element containing one (or more) field for data, and also containing two pointers linking the element to the next and previous elements. In one embodiment, the data in each element is made up of a token or other pointer referencing the buffered data packet (and any appended data) which the element represents. In other embodiments, the token or other pointer may reference a table which includes certain portions of the information from the buffered packet and other sources. For example, the token or other pointer may directly or indirectly reference the modcode and address/SNR tables (200, 250) in FIGS. 2A and 2B. There are thus a variety of ways in which the one (or more) data field from an element may be associated with the buffered data packet (and any appended data) which the element represents.

As noted, the linked list 1315 may be characterized as a data structure made up of a sequence of elements, each element containing a field (or fields) for data, and also containing pointers linking the element to the next and previous elements. In one embodiment, the linked list is a circularly linked list, where the last element in the list is linked back to the first. For ease in discussing the following embodiment, the "top" of the list will hereinafter be referred to as part of the list holding the element associated with the oldest packet remaining to be forwarded, while the "bottom" of the list will hereinafter be referred to as the part of the list holding the element associated with the newest packet remaining to be forwarded. As data packets are received, their associated elements are inserted into the bottom of the list, to thereby construct the list.

Note that while in other embodiments packet forwarding queues may be used to shape and control traffic, a different though related mechanism may be used in the following embodiments. For example, instead of having modcodes related to queues, consider an embodiment wherein each of a number of modcodes is related to signal quality ranges (without also necessarily be related to physical queues). This relation could be embodied on one or more memories, which may be either on or off chip. This relation may, for example, be the table 200 of FIG. 2A. However, there are a variety of ways in which signal qualities ranges may be related to modcodes. Note also that there may more than one range related to each modcode, and the ranges may be of any size.

As noted above, when data packets are received by the traffic shaping device 1300, the processing unit 1305 may store received data packets (and any appended data) in the buffers 1310. The processing unit 1305 also inserts a new element associated with the buffered data packet in the linked list 1315. The processing unit 1305 may then identify a signal quality range associated with a given modcode. Identified items in the list will be removed in some embodiments, so that the top of the list will identify the oldest packets to be transmitted, and the linked list will proceed to the bottom in chronological order. The processing unit 1305 will then iterate through the linked list 1315 to identify elements associated with data packets destined for links within the identified signal quality range. Once the bottom of the list is reached, the processing unit 1305 may circle to the top of the linked list 1315, and iterate through to identify elements associated with links within a second signal quality range assigned to the next higher order modcode. This process may be repeated to identify elements associated with packets for incrementing higher modcodes. Once the signal quality range associated with the highest order modcode is emptied, the process is then repeated beginning from the signal quality range associated with the lowest order modcode. This order of progression is merely one example of many, but will be used for much of the discussion below The transmitting unit 1320 is configured to access or otherwise receive the buffered data packets. The transmitting unit 1320 may transmit the packets in an order corresponding to a sequence in which their associated elements are identified, and according to the modcode assigned to the identified signal quality range. In one embodiment, the transmitting unit 410 of FIG. 4 is the transmitting unit 1320 of FIG. 13. Once data is transmitted (or perhaps upon confirmation of receipt), the memory (e.g., buffers 1310) for the transmitted packet may be allocated as available.

The processing unit 1305 may be configured to identify packets according to a defined order of progression. Also, the transmitting unit 1320 may be configured to transmit the packets according to the defined order of progression, and to produce a broadcast signal output 1325. In one embodiment, the defined order of progression comprises identifying and transmitting received data packets in a given signal quality range associated with a first modcode (e.g., in sequence from oldest to youngest), before identifying and transmitting each received data packet associated with a next higher order modcode (again, perhaps in sequence from oldest to youngest), and incrementing accordingly to the highest order modcode. Once the packets associated with highest order modcode are identified, the process may then be repeated beginning from the identified packets from the lowest order modcode.

Note that in one embodiment, the defined order of progression may provide for transmitting at least one data packet within a first signal quality range assigned a first modcode and a data packet or fragment from a second signal quality range assigned a second modcode in a single frame according the lower order modcode. For example, when there is additional space available in a base-band frame 320 and no other remaining packets are associated with a current modcode, a data packet (or fragment thereof) associated with a next higher order modcode may be inserted into the base-band frame 320. Note, also, that the term "defined order of progression" includes any of a number of schemes that may order and format packets for forwarding based on modcode, destination address, order received, age, etc.

In one embodiment, the defined order of progression is interrupted upon expiration of a timer (hereinafter "interrupt timer"), and a packet exceeding a threshold age is identified. In one embodiment, the identified packet is the oldest received packet not yet transmitted (i.e., it is the packet from the top of the list). The identified packet is then transmitted, and the defined order of progression may be restarted from the transmitted packet (i.e., the "current" signal quality range will become the signal quality range of the identified packet, and the iteration through the list will continue).

Figure 14:
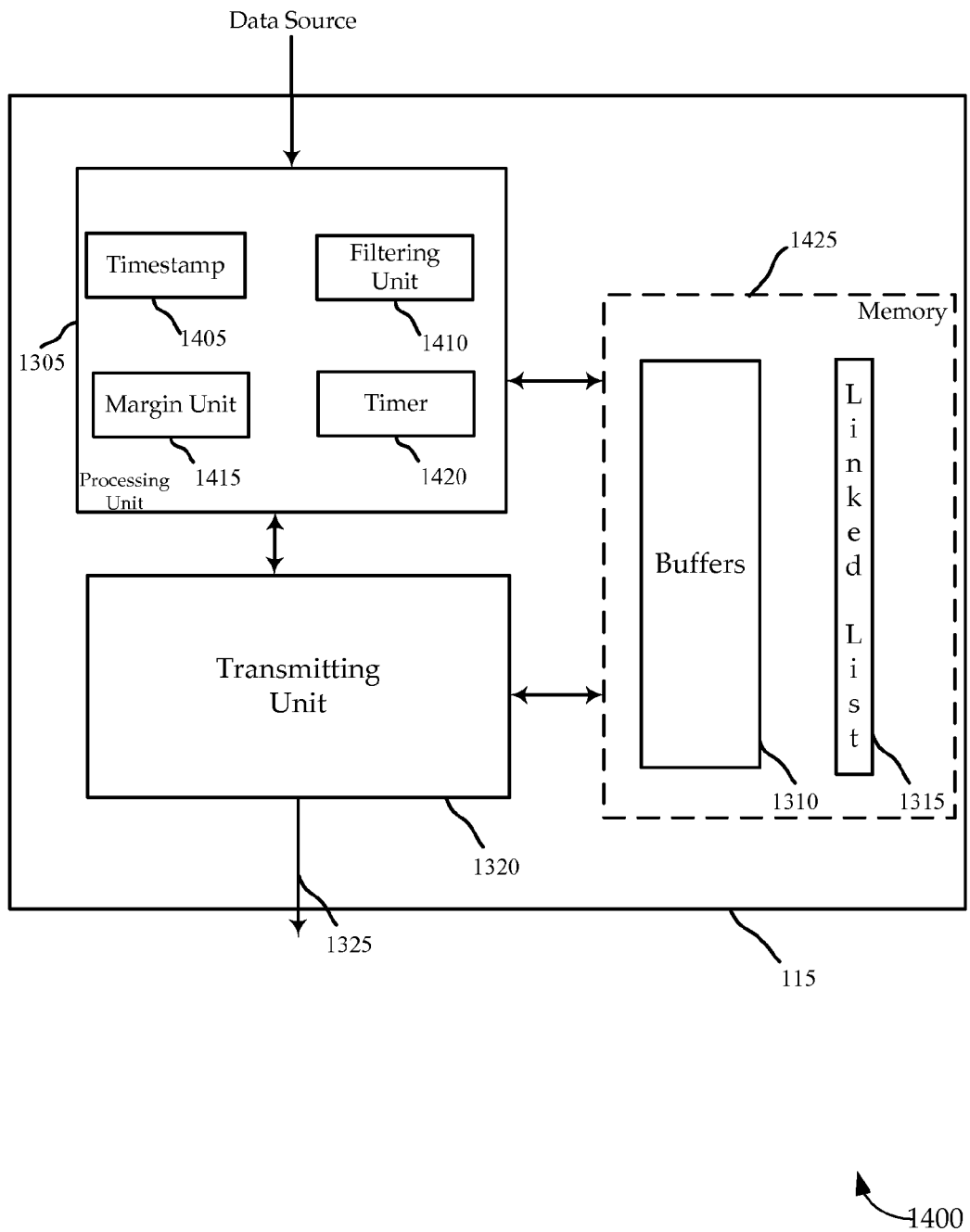
FIG. 14 is a simplified block diagram illustrating an alternative communications device configured to use a linked list according to various embodiments of the present invention.

Turning to FIG. 14, an alternative embodiment of the traffic shaping device 1300 is illustrated, including additional component functionality from that described with respect to FIG. 13. In addition to the functionality described above for FIG. 13, the processing unit 805 in this embodiment may include a timestamp 1405, a filtering unit 1410, a margin unit 1415, and a timer 1420. The traffic shaping device 1300 may utilize these components to control certain flow modifications. The timestamp 1405 may be used to append or otherwise associate a time to a packet when it is received by the device, or at other processing stages. The timestamp 1405 may, therefore, be used to determine the "age" of the given packet. The timestamp may be used by other components of the traffic shaping device 1300 to determine latency associated with a particular packet or packets at different stages of processing (i.e., latency from receipt at the device 1300 to transmission, latency within the processing unit 1305, etc.).

The processing unit 1305 may make use of a timestamp in a number of ways. For example, consider an interruption of the defined order of progression to identify an out of order packet. If age (determined through use of the timestamp 1405) of the identified packet exceeds a first threshold age (e.g., 70 mS), the filtering unit 1410 may be configured to allow an element to be inserted into the linked list 1315 only if a data packet has a threshold quality or class of service, while blocking others. If the identified packet exceeds a second threshold age (e.g., 120 mS), the filtering unit 1410 may be further configured to prevent any elements from being inserted into the linked list. The processing unit 1305 may be configurable to change these thresholds.

In one embodiment, the processing unit 1305 includes a margin unit 1415 configured to dynamically change a signal quality range associated with one or more queues. The margin unit 920 may vary the signal quality range associated with a modcode to modify a reliability margin for data packets destined for a link within the varied signal quality range. By way of example, the margin unit 1415 may be configured to increase the minimum signal quality of a range when traffic is light, and decrease the minimum signal quality of a range when traffic is heavy. This adjustment may, for example, be made based on the age of the packet identified at the expiration of the timer 1420.

As noted above, according to one set of embodiments, the defined order of progression is interrupted upon expiration of a timer, and a packet exceeding a threshold age, and from an out of order signal quality range, is identified. The timer may be located on, or off the device. In one embodiment, an on-device timer 1420 is located in the processing unit 1305. The processing unit 1305 may be configured to change the period of the timer based at least in part on the latency measure or a data flow measure (e.g., decreasing the period of the timer if the age of the packets and data flow through the device 1300 increase). While these changes may be associated with the age of the packet identified, other latency and traffic flow measurements may be used to modify the parameters related to reliability margin, block and allow rules, and period of the timer.

It is also worth noting that the linked list and buffers may be located in separate areas of memory, or share an area of memory 1425.

Figure 15A:
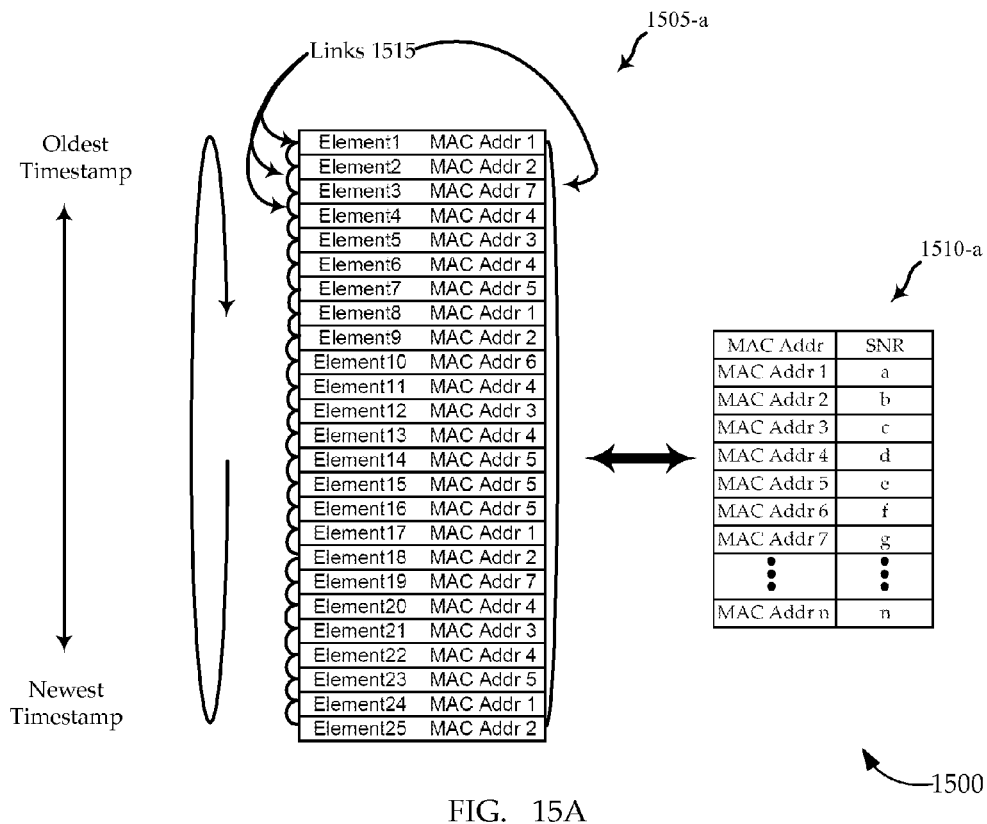
FIGS. 15A and 15B are block diagrams illustrating use of a linked list according to various embodiments of the present invention.

Turning to FIG. 15A, a block diagram 1500 illustrating a simplified example of an ACM implementation using a linked list is shown. The block diagram illustrates how a linked list 1505 may be used to control the flow of traffic. The linked list 1505 of FIG. 15 may be the linked list 1315 of FIGS. 13 and 14. In this embodiment, the linked list 1505 is a data structure made up of a sequence of elements (or nodes), each element containing one (or more) fields for data, and also containing two pointers linking the element to the next and previous elements. The pointers linking each element to the next and previous elements are shown as links 1515. While the elements 1-25 in FIG. 15A are shown as being adjacent to one another, they may in fact occupy very diverse regions of memory, as is evident to those skilled in the art. In one embodiment, the data in each element is made up of a token or other pointer referencing a buffered data packet (and any appended data) which the element represents. In other embodiments, the token or other pointer may indirectly reference a table which includes certain portions of the information from the buffered packet and other sources. For example, in this embodiment a table 1510 is indirectly connected to linked list 1505, and the table 1510 shows the SNR estimate for the link associated with a variety of MAC addresses.

In this embodiment, the linked list 1505 is a circularly linked list, where the last element in the list is linked back to the first. For ease in discussing the following embodiment, the "top" of the list will be referred to as part of the list holding the element associated with the oldest packet remaining to be forwarded, while the "bottom" of the list will be referred to as the part of the list holding the element associated with the newest packet remaining to be forwarded. As data packets are received, their associated elements are inserted into the bottom of the list, to thereby construct the list. As packets are identified for transmission, their associated elements are removed from the list.

FIG. 15A illustrates the list at first time ($T_1$). Assume that in this embodiment, a first signal quality range includes SNR "a", but no other SNRs are in the range. For each element, the device 1300 may identify the MAC address of the element, and then access the table 1510-*a* to determine if the element is associated with a MAC address in the range. The device 1300 iterates through the linked list 1505-*a* from elements 1-25, identifying and removing elements 1, 8, 17, and 24, because these elements are associated with SNRs within the range. A second signal quality range associated with the next higher modcode includes SNR "g", but no other SNRs are in the range. For each remaining element, the device 1300 may identify the MAC address of the element, and then access the table 1510-*a* to determine if the element is associated with a MAC address in the range. The device 1300 iterates through the linked list 1505, identifying and removing elements 3 and 19, because these elements are associated with SNRs within the second range. The packets associated with elements 1, 8, and 17 are transmitted in a first frame according to the modcode assigned to the first signal quality range. However, because there is space in the DVB-S2 base-band frame 320, packets associated with elements 24 and 3 are transmitted in a second frame according to the modcode assigned to the first signal quality range. The packet associated with element 19 are transmitted in a third frame according to the modcode assigned to the second signal quality range.

Figure 15B:
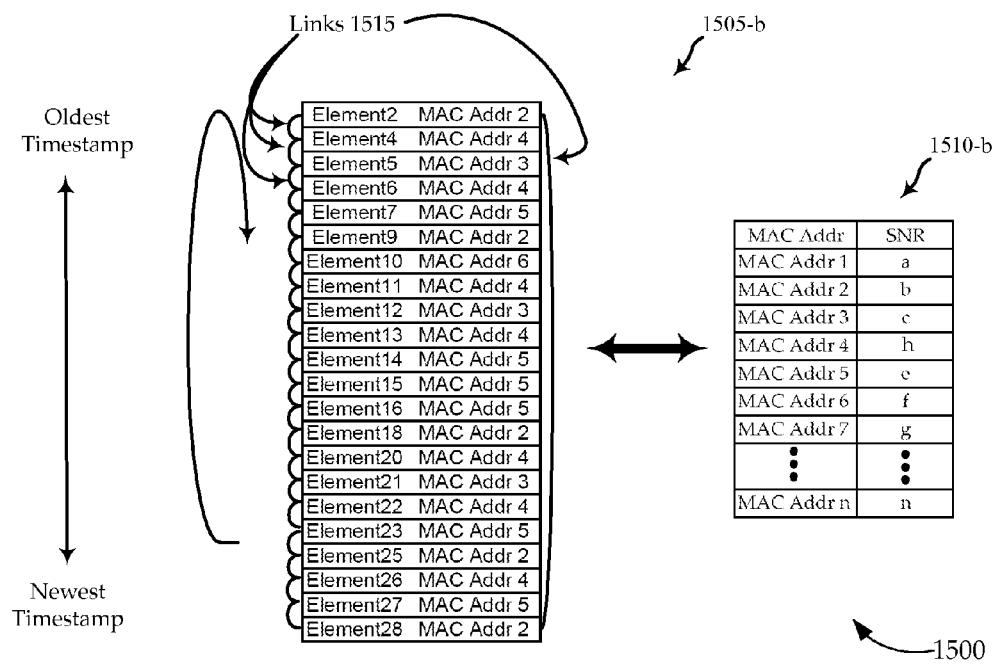

FIG. 15B shows the linked list 1505-*b* at a second time ($T_2$) after the device has iterated through elements 1-25, then through 2-7, 9-16, and 18-23, at which time the timer expires. As is evident, elements 1, 3, 8, 17, 19, and 24 have been removed from the linked list 1505-*b*, and new elements 26-28 have been added, and the elements that remain are linked from oldest at the top to newest at the bottom. However, instead of iterating though elements 25-28, the device 1300 will go to the top of the linked list to identify the oldest element (element 2) because of the expiration of the timer. The device will identify the signal quality range of this identified element, and iterate from element 2 down through the list, identifying other elements associated with packets in this range. Also note that with the expiration of the timer, the table 1510-*b* is updated, and there is a new SNR for MAC address 4. The foregoing example is used only to illustrate a simplified example of how a linked list may be used in various embodiments of the invention.

Figure 16:
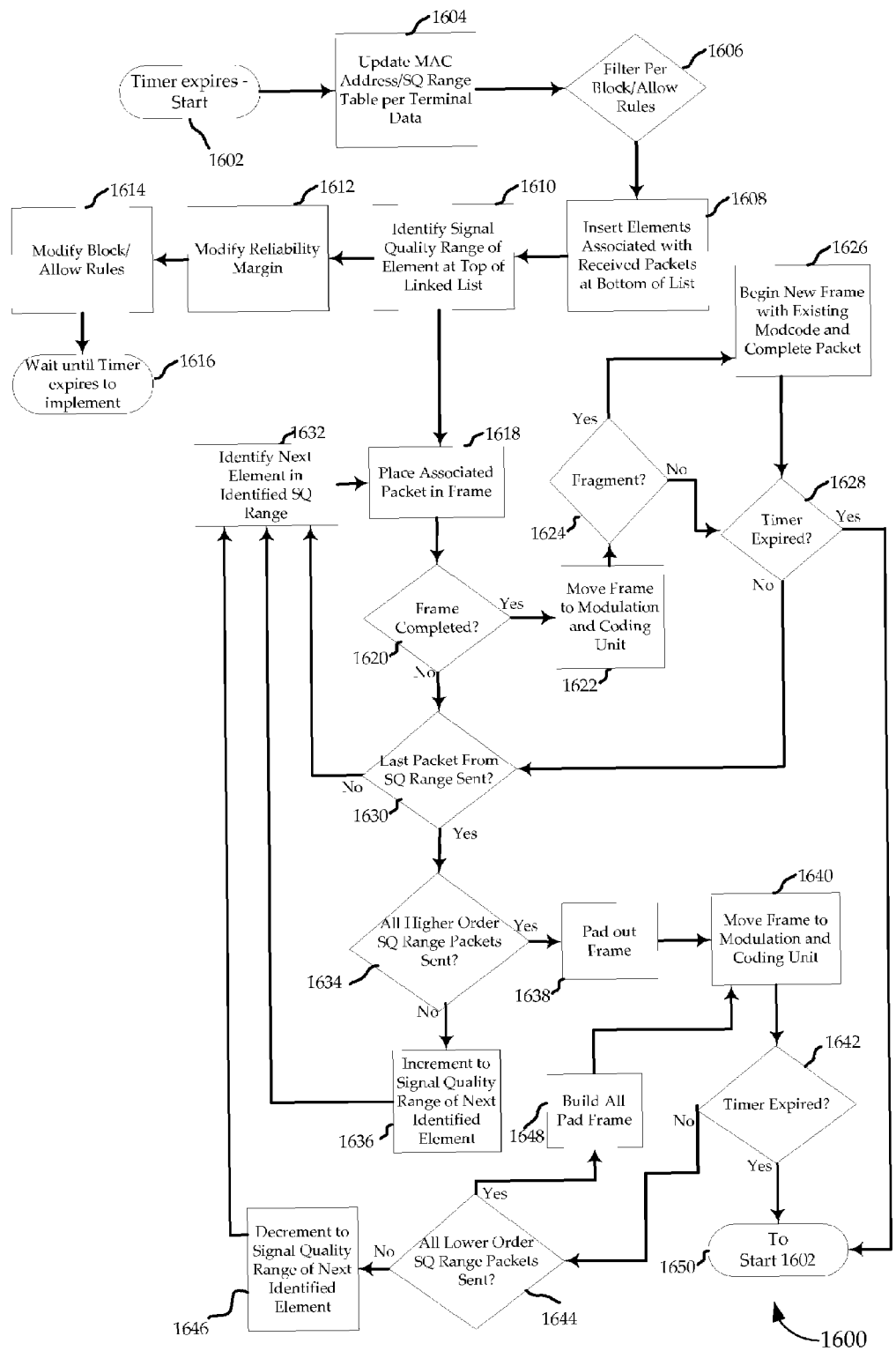
FIG. 16 is a flow diagram illustrating a flow control process using a linked list according to various embodiments of the present invention.

Turning to FIG. 16, a flow diagram illustrates an example decision flow 1600 for a device, such as the traffic shaping device 1300 of FIG. 13 or 14. Assume a linked list, such as the linked list 1505 of FIG. 15A or 15B, is ordered chronologically with the oldest elements at the top of the list. At block 1002, assume that the process begins upon the expiration of a timer, such as the timer 1420 in the processing unit 1305 of FIG. 1400. The timer then restarts. In this embodiment, different SNR ranges are associated with different modcodes. Also, there is a table in which MAC addresses of the destination terminals are associated SNRs 1510. At block 1604, these tables are updated with revised SNR information from the terminals. Incoming data packets are filtered at block 1606 according to blocking rules based on latency measurement for the device 1300, and these rules may for example be implemented by the filtering unit 1410. At block 1608, allowed packets are associated with elements, and the elements are inserted into the bottom of the linked list. At block 1610, the signal quality range encompassing the signal quality for the link of the data packet associated with the element at the top of the list is identified. These first blocks in FIG. 16 (1602, 1604, 1606, 1608, 1610) may be initiated together at on or about the same time.

The reliability margin calculations for each modcode may then be revised, at block 1612, based on the age of the packet at the top of the list (e.g., by varying the signal quality range associated with the modcode). Also, the blocking rules may be modified at block 1614, also based on the age of the packet at the top of the list (i.e., the oldest packet). These revisions will be implemented at block 1616, upon the expiration of the timer. In other embodiments, the period of the timer may be modified based on the age of the oldest packet, as well. Note, also, that in other embodiments, other latency or flow measurements may be used to adjust the reliability margin, filtering rules, or period of the timer.

At block 1618, the packet (or fragment thereof) associated with the element from the top of the list is moved from the buffer to the payload portion of a frame, for example, a base-band frame 320 for the DVB-S2 system. The element may then be removed from the top of the list. At block 1620, a determination is made as to whether the frame is completed (e.g., a determination that there is no available space left in the frame). If the frame is complete, the frame is encapsulated and forwarded to the modulation and coding unit at block 1622, where it is encoded and mapped accordingly. At block 1624, a determination is made whether the frame includes a beginning of a fragment. If so, block 1626 indicates that the next frame will begin with the remaining portion of the fragment to complete the packet (regardless of whether timer expires in interim). At block 1628, a determination is made whether the timer has expired. If yes, at block 1650 the process 1600 is restarted, back to block 1602.

Returning to block 1620, if the determination is made that the frame is not complete, the frame may continue to be filled. Similarly, if the timer has not expired at block 1628, a new frame may be constructed. In each case, a determination is made at block 1630 regarding whether the last packet from the current signal quality range has been sent. This is accomplished by iterating down through the elements of the linked list and checking whether the SNRs of each associated data packet fall with the current range. If so, the next applicable element down the list is identified at block 1632, and the process returns to block 1618 to move the packet associated with the element from the buffers to fill (or begin) the frame. However, if it is determined that no packets remain in the current signal quality range (i.e., the bottom of the linked list is reached), a frame may still be filled or constructed with a packet from a queue associated with a higher order queue.

Thus, at block 1634, a determination is made whether other elements are associated with any signal quality ranges assigned to higher order modcodes are empty. This is accomplished by circling to the top of the list and iterating through the list to determine if there are elements associated with the signal quality range assigned to the next higher modcode, and continuing this circling. If there is an element associated with a higher order modcode, a signal quality range increments, at block 1636, to the signal quality range of that element, and then returns to blocks 1632 and 1634 to identify the element and move the associated packet from the buffer to fill (or begin) the frame. When a frame is eventually completed and forwarded to the modulation and coding unit at block 1622, and packets associated with different modcodes are in a single frame, the lowest order modcode associated with the packets of the frame is used. It will be evident to those skilled in the art how the process described may identify the packets from a signal quality range assigned to a modcode to construct and fill frames, and then circle to the top of a list to identify packets from the signal quality range associated with the next higher modcode.

Returning to block 1634, if it is determined that there are no elements associated with higher order modcodes, the frame is padded at block 1638 (e.g., with the padding 315 of a DVB-S2 base-band frame 320). The frame is encapsulated and forwarded to the modulation and coding unit at block 1640, where it is encoded and mapped accordingly. At block 1642, a determination is made whether the timer has expired. If yes, the process 1600 is restarted at block 1650. If the timer has not expired, at block 1644, a determination is made whether any elements associated with packets assigned to lower order modcodes remain in the linked list. This is accomplished by circling to the top of the linked list and iterating through the list to determine if there are elements associated with the signal quality range assigned to the lowest order modcode, and continuing this circling. If such an element is found, the process decrements, at block 1646, to the signal quality range of that element, then returns to blocks 1632 and 1634 to identify the element and move the associated packet from the buffer to begin the frame, with the process moving forward from that point.

Returning to block 1644, if a determination is made that no elements associated with packets assigned to lower order modcodes remain, an all pad frame is built at block 1648. The process returns to block 1640, where the all pad frame is encapsulated and forwarded to the modulation and coding unit, where it is encoded and mapped accordingly, and the process continues from there.

Figure 17:
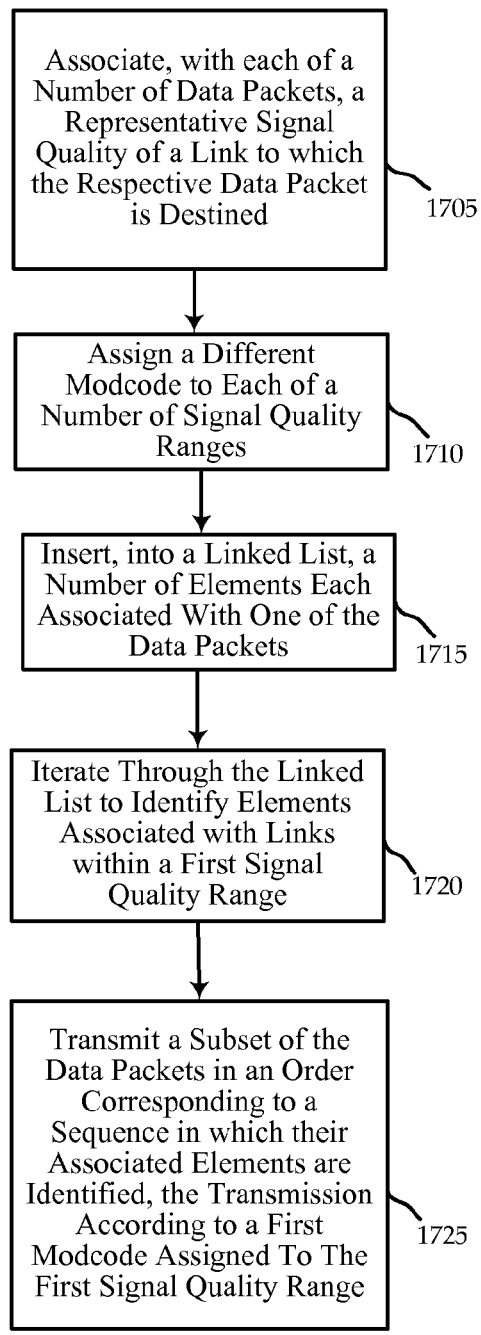
FIG. 17 is a flowchart illustrating an iteration through a linked list in which elements are linked according to various embodiments of the present invention.

FIG. 17 is a flowchart illustrating a process 1700 for controlling the flow of data traffic by implementing adaptive coding and modulation using a linked list data structure. The process may be performed, for example, in whole or in part, by the device 1300 of FIG. 13 or 14. At block 1705, each of a number of data packets is associated with a signal quality, the signal quality being a representative signal quality of a link to which the packet is destined. At block 1710, a different modcode is assigned to each of a number of signal quality ranges.

At block 1715, a number of elements are inserted into a linked list, each element associated with one of the data packets. At block 1720, the linked list is iterated through to identify elements associated with links within a first signal quality range. At block 1725, data packets are transmitted in an order corresponding to a sequence in which their associated elements are identified, the transmission according to a first modcode assigned to the first signal quality range.

Figure 18:
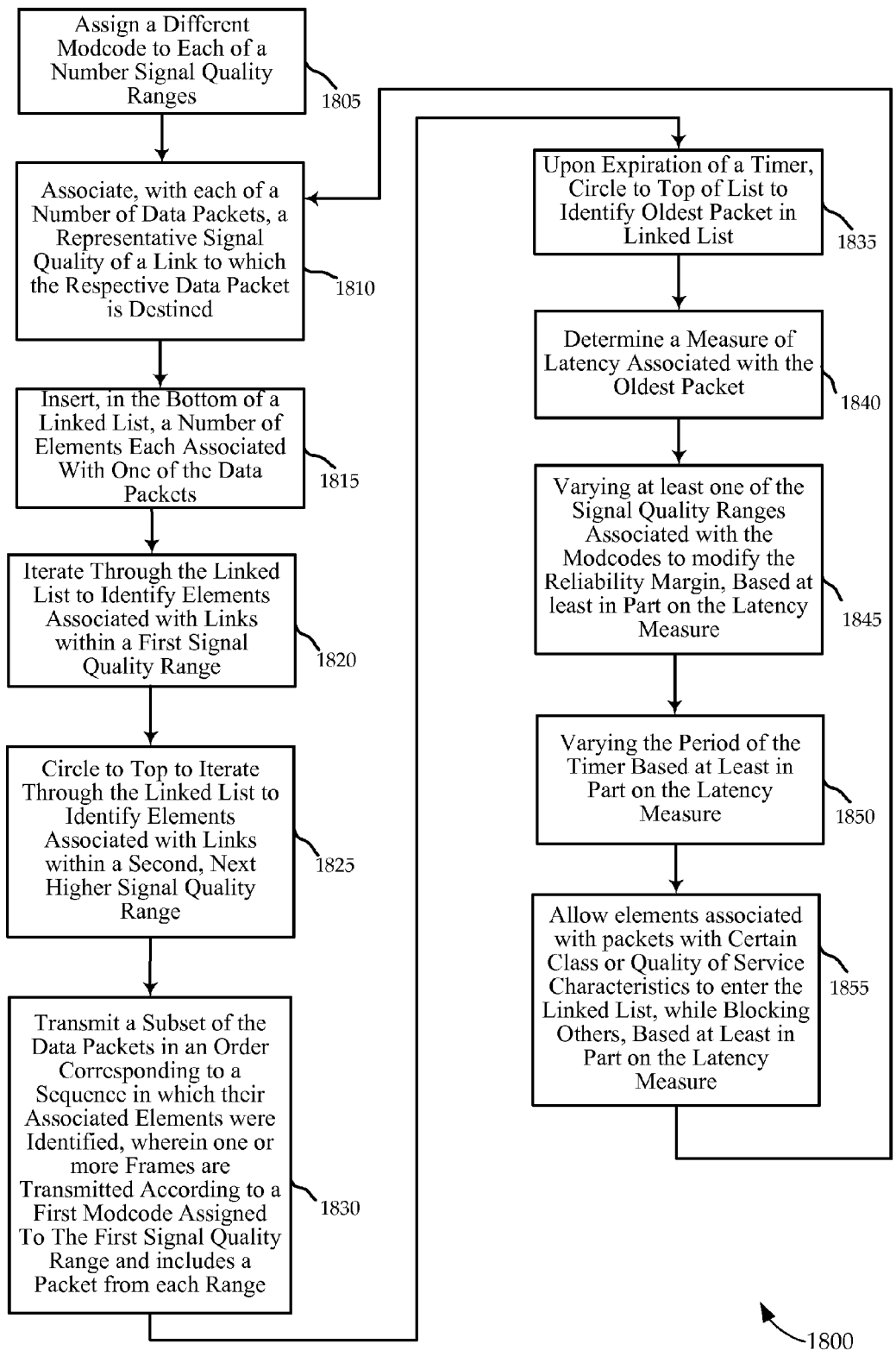
FIG. 18 is a flowchart illustrating an alternative process for iteration through a linked list in which elements are linked according to various embodiments of the present invention.

Turning to FIG. 18, a flowchart is shown which illustrates an alternative process 1200 for controlling the flow of data traffic using linked list data structures to implement adaptive coding and modulation. The process may be performed, for example, in whole or in part, by the device 1300 of FIG. 13 or 14. At block 1805, different modcodes are assigned to each of a number of signal quality ranges. At block 1810, a number of data packets are associated with a signal quality, the signal quality being a representative signal quality of a link to which each packet is destined.

At block 1815, in a linked list connected chronologically from oldest element at the top to newest element at the bottom, a number of elements each associated with one of the data packets are inserted. At block 1820, the linked list is iterated through to identify elements associated with links within a first signal quality range. At block 1825, after circling to the top of the linked list, the linked list is iterated through to identify elements associated with links within a second, next higher signal quality range. At block 1830, data packets are transmitted in an order corresponding to a sequence in which their associated elements are identified, wherein one or more frames are transmitted according to a first modcode assigned to the first signal quality range, and each frame includes a packet from both ranges.

At block 1835, upon expiration of a timer, a pointer circles to the top of list to thereby identify the oldest packet in the linked list. The packet may then be transmitted. At block 1840, a measure of latency associated with the oldest packet is determined. At block 1845, at least one of the signal quality ranges associated with the modcodes is changed to modify a reliability margin, based at least in part on the latency measure. At block 1850, the period of the timer is modified based at least in part on the latency measure. At block 1855, only elements associated with packets with certain class or quality of service characteristics are allowed to enter the linked list, while others are blocked, based at least in part on the characteristics of the latency measure.

Figure 19:
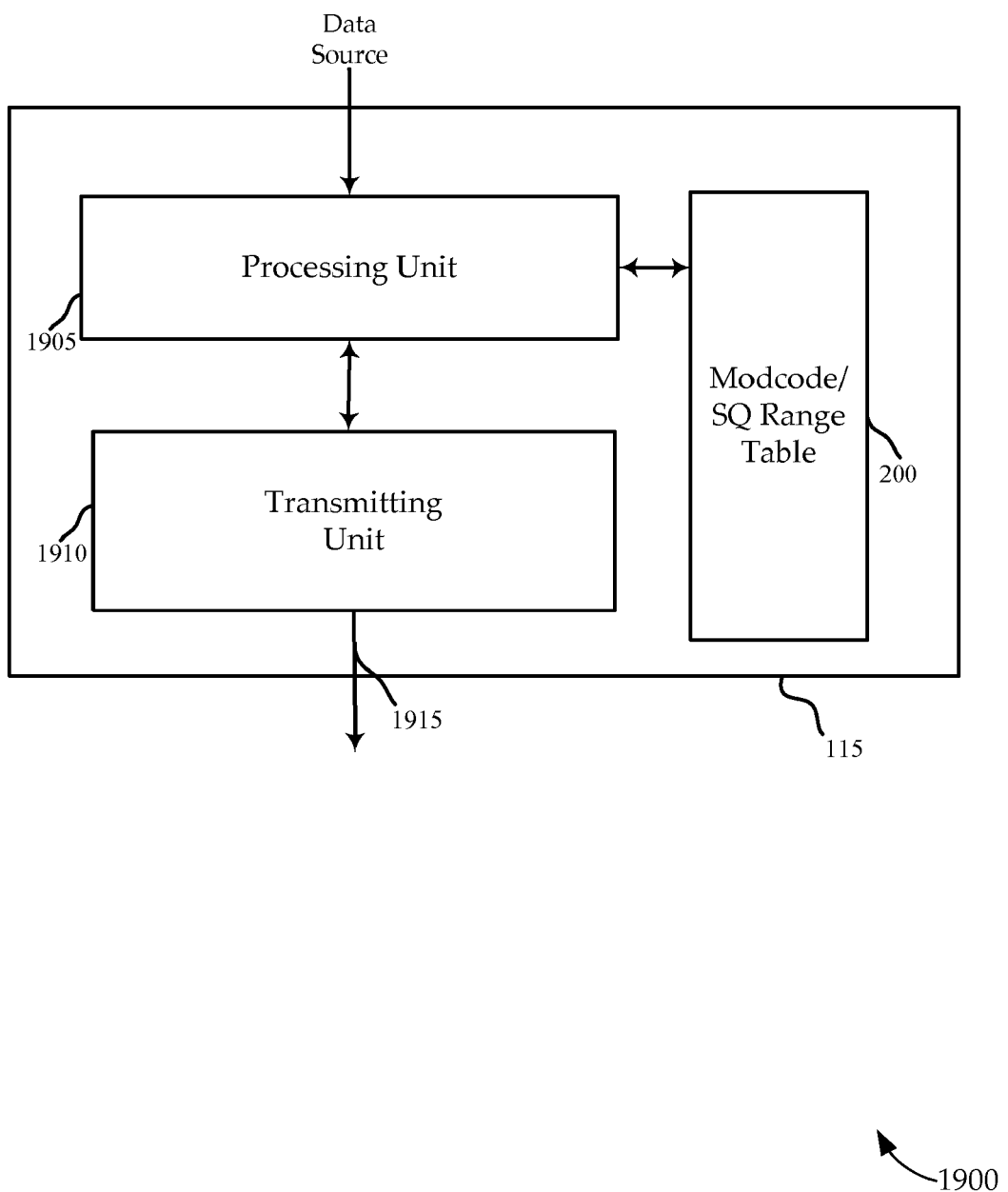
FIG. 19 is a simplified block diagram illustrating a communications device configured to vary a reliability margin according to various embodiments of the present invention.

Referring next to FIG. 19, a simplified block diagram illustrates an example of a flow control and traffic shaping device 1900 configured to dynamically change the reliability margins associated with different modcodes in an ACM system. The flow control and traffic shaping device 1900, in one embodiment, may be the device 400 described in relation to FIG. 4, implementing adaptive modulation and coding utilizing a dynamically variable reliability margin.

The device 1900 in this embodiment includes a processing unit 1905, a transmitting unit 1910, and a table 200 in which modcodes are assigned to various signal quality ranges. These components (1905, 1910, and 200) may be in communication with one another, and may be implemented, in whole or in part, in hardware. Thus, they may comprise one, or more, Application Specific Integrated Circuits (ASICs) adapted to perform a subset of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. Each may also be implemented, in whole or in part, with instructions embodied in a computer-readable medium, formatted to be executed by one or more general or application specific processors. The modcode/signal quality range table 200 may be embodied on one or more memories, which may be either on or off chip.

For purposes of discussion, assume that the device 1900 is a gateway 115 within the system 100 of FIG. 1. However, note that in other embodiments, the device 1300 may be used in any number of different ACM implementations. As noted in regard to other embodiments, each terminal 130 may measure the signal quality of the service link using any one of a variety of metrics, and transmit the measurement to the flow control and traffic shaping device 1900 via the return path. In other embodiments, the device 1900 may receive the link signal quality data from other sources as well. The device 1900 may then have receive signal quality metrics for each receiving terminal (e.g., the address/SNR table 250 of FIG. 2B), and may organize this data on one or more memories.

The processing unit 1905 is configured to assign a different modcode to each data packet after the packet is received by the device. This assignment is based at least in part on a signal quality of a link to which the respective packet is destined. The processing unit 1905 is configured to use a destination, in conjunction with the signal quality estimate, to identify a modcode to use to communicate with a terminal 130. To do so, the processing unit 1905 accesses a modcode table 200, or other mechanisms which correlate certain signal quality ranges with different modcodes.

Additionally, the processing unit 1905 in this embodiment is configured to dynamically change a signal quality range associated with one or more modcodes. The processing unit 1905 may change or otherwise vary the signal quality range associated with a modcode to modify a reliability margin for data packets destined for a link within that signal quality range. By way of example, the processing unit 1905 may be configured to increase the minimum signal quality of a particular range when traffic is light, and decrease the minimum signal quality of a particular range when traffic is heavy. The processing unit 1905 in this embodiment may also possess the functionality of the margin units (920, 1415) described in other embodiments.

Figure 20:
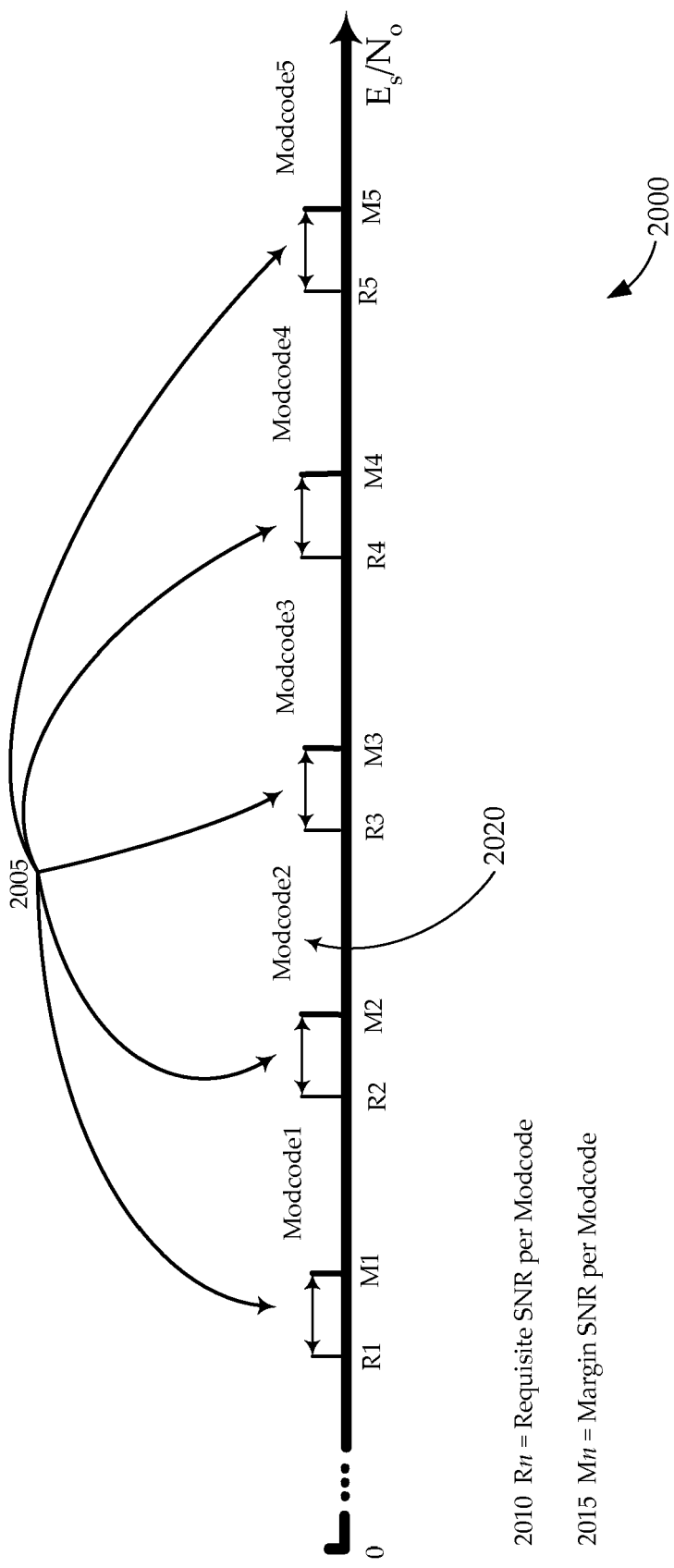
FIG. 20 is a linear representation of a number of variable signal quality ranges for use according to various embodiments of the present invention.

Turning briefly to FIG. 20 to describe further the scope of this terminology, a linear representation of a range of SNR values 2000 is illustrated. The reliability margin 2005 for each of a number of modcodes is shown, as well. The lower limit 2010 of the $E_s/N_o$ value for a particular modcode is shown as the point Rn in FIG. 20. The lower limit 2010 is a somewhat arbitrary characterization, as it may be calculated in a number of different ways. For purposes of this discussion, it may include any identified, requisite, or otherwise suggested boundary for the lower limit for an $E_s/N_o$ value of a particular modcode. The implemented lower limit 2015 of an $E_s/N_o$ value is shown as well, as points Mn in FIG. 20, and is the lower limit 2010 plus a reliability margin for a particular modcode. A reliability margin 2005 is, therefore, the difference between a lower limit 2010 and an implemented lower limit 2015, and may include any environmental, weather, implementation, or other margin.

In various embodiments of the invention, the reliability margin for one or more modcodes may be varied dynamically. Consider, for purposes of example, modcode2 2020. Consider first a period of relatively low traffic, and thus low latency. In such an environment, there may be excess capacity available, and thus the reliability margin 2015 may be increased (e.g., to 4 dB) without impacting latency or flow. This way, the reliability margin may be dynamically increased as traffic lightens. However, if there is a sudden burst of significant traffic through the device 1900, the flow demands on the device 1900 may be increased. Thus, the reliability margin 2015 may be dynamically decreased as traffic increases, either incrementally (e.g., 4 dB, to 3 dB, to 2 dB, to 1 dB, to 0.5 dB), or otherwise. A number of factors (latency, flow, anticipated traffic, etc.) may be used to dynamically control a reliability margin, as will be discussed in further detail below. In one embodiment, the reliability margin 2015 is zero. In another embodiment, the reliability margin is fixed, and the signal quality ranges may vary only with changes in weather or other environmental conditions.

Returning to FIG. 19, the processing unit 1905 may perform other functions in addition to dynamically adjusting the signal quality range associated with different modcodes. For example, the processing unit 1905 may identify packets for transmission based on modified signal quality ranges, and according to a defined order of progression. The transmitting unit 1910 may transmit packets according to the defined order of progression, and produce a broadcast signal output 1915. In one embodiment, the defined order of progression entails transmitting each received data packet in a given modified signal quality range assigned to a first modcode (e.g., in sequence from oldest to youngest), before incrementing to the next higher order modcode and transmitting each received data packet in a modified signal range associated with a next higher order modcode (again, perhaps in sequence from oldest to youngest), and incrementing accordingly to the highest order modcode. Once the highest order modcode is emptied, the process is then repeated beginning from a modified signal quality range associated with the lowest order modcode. Note that in one embodiment, the defined order of progression may provide for transmitting at least one data packet from a first modified signal quality range and a data packet or fragment from a second modified signal quality range according to the lower order modcode. Note, also, that the term "defined order of progression" may include any of a number of packet forwarding schemes that may order and format packets for forwarding based on modcode, destination address, order received, age, etc., or perhaps randomly.

In one embodiment, the defined order of progression is interrupted upon expiration of a timer (hereinafter "interrupt timer"), and a packet exceeding a threshold age, and from an out of order signal quality range, is identified and transmitted. The identified packet in one embodiment is the oldest received packet not yet transmitted (i.e., the threshold age is the second oldest packet). The defined order of progression may be restarted from the transmitted packet.

The age of the out of order packet may be utilized in a variety of ways to modify the control of packets through the device 1900. Moreover, other latency and flow measurements may be made by the processing unit 1905 and the transmitting unit 1910. The delay at the device 1900 associated with certain functions and components, or groups of functions and components, may be measured. This type of latency measurement may occur for the out of order packet, or select groups of other packets. The latency measurement may, for example, simply be a count of those packets transmitted that are over some threshold age. A number of latency and packet flow measurements are known in art, and any may be used herein.

In addition to on-device latency measurements, external devices may provide additional data, whether locally or from the network. For example, a network operations center (NOC) may transmit certain latency statistics or flow information to a device. A NOC may also provide information on a future change in traffic flow. A variety of network and testing tools are known in the art that may provide flow statistics, latency measurements, and other network information to a device 1900.

The processing unit 1905 may use the latency information, flow statistics, and additional network information described above to dynamically change a signal quality range associated with a given modcode and thereby to modify the associated reliability margin. In one embodiment, the reliability margin may be adjusted based on the age of the identified out of order packet, for example: if T0>90 mS, set reliability margin to 0.5 dB; if 90 mS>T0≧60 mS, set reliability margin to 1 dB; and if 60 mS>T0, set margin to 2 dB. Other thresholds may be established to modify signal quality ranges (i.e., to change the reliability margin) based on the other latency information, flow statistics, and additional network information described above.

The processing unit 1305 may make use of the latency information, flow statistics, and additional network information described above in a number of other ways. It may use all the received information, or only selected aspects of the received information. By way of example, in addition to modifying the reliability margin, filtering rules for blocking or allowing certain packets may be changed to account for the latency information, flow statistics, and/or additional network information described above. For example, in periods of higher traffic, QoS/CoS priority filtering rules may be implemented. Also, the period of the timer may be modified based on the latency information, flow statistics, and/or additional network information described above. Thus, the period may be decreased when latency increases, to more regularly jump to the oldest remaining packets.

Figure 21:
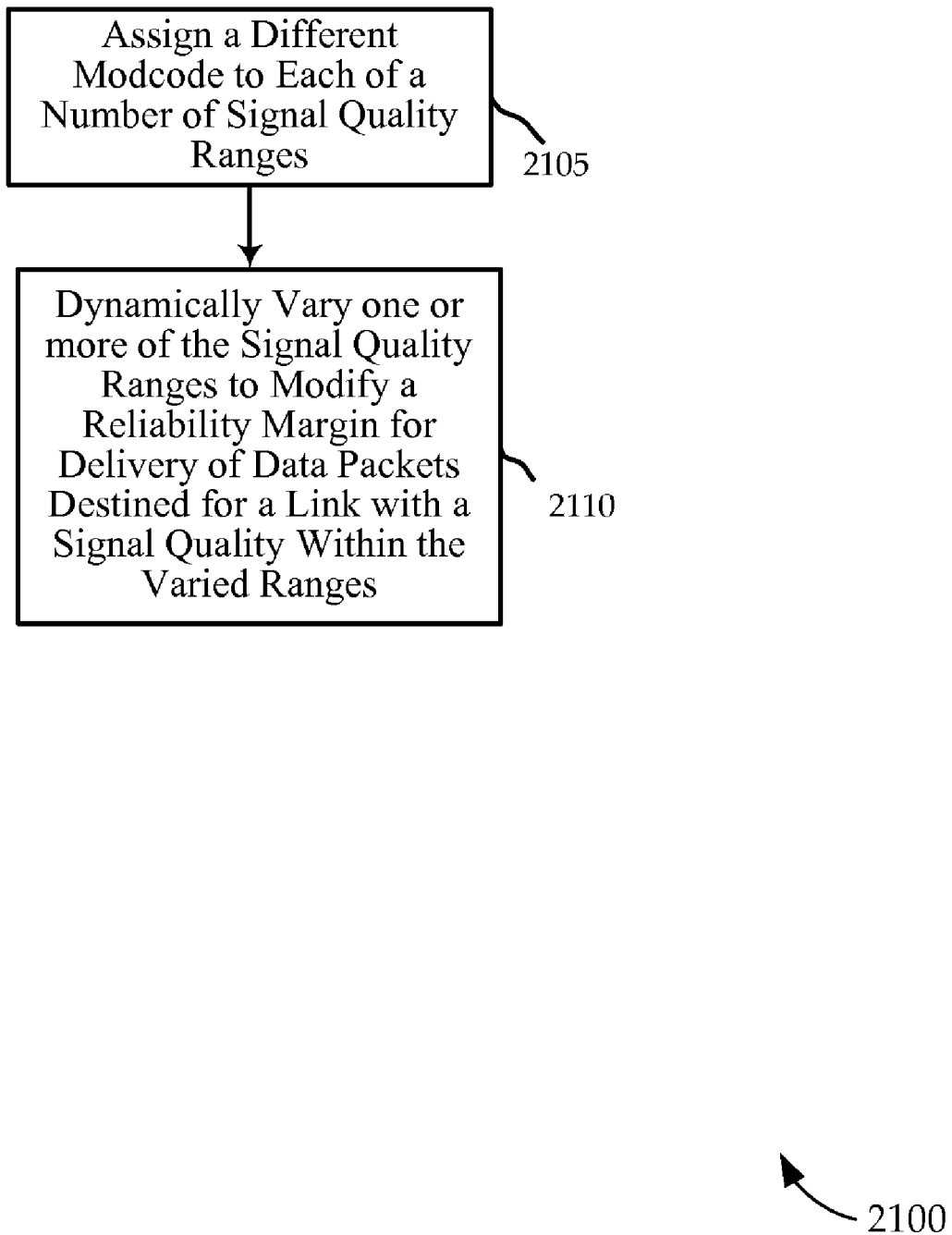
FIG. 21 is a flowchart illustrating a variable reliability margin configured according to various embodiments of the present invention.

FIG. 21 is a flowchart illustrating a process 2100 for controlling the flow of data traffic by implementing adaptive coding and modulation using a dynamic reliability margin. The process may be performed, for example, in whole or in part, by the device 1900 of FIG. 19. At block 2105, a different modcode is assigned to each of a number signal quality ranges. At block 2110, one or more of the signal quality ranges are dynamically varied to modify a reliability margin for delivery of data packets destined for a link with a signal quality within the range.

Figure 22:
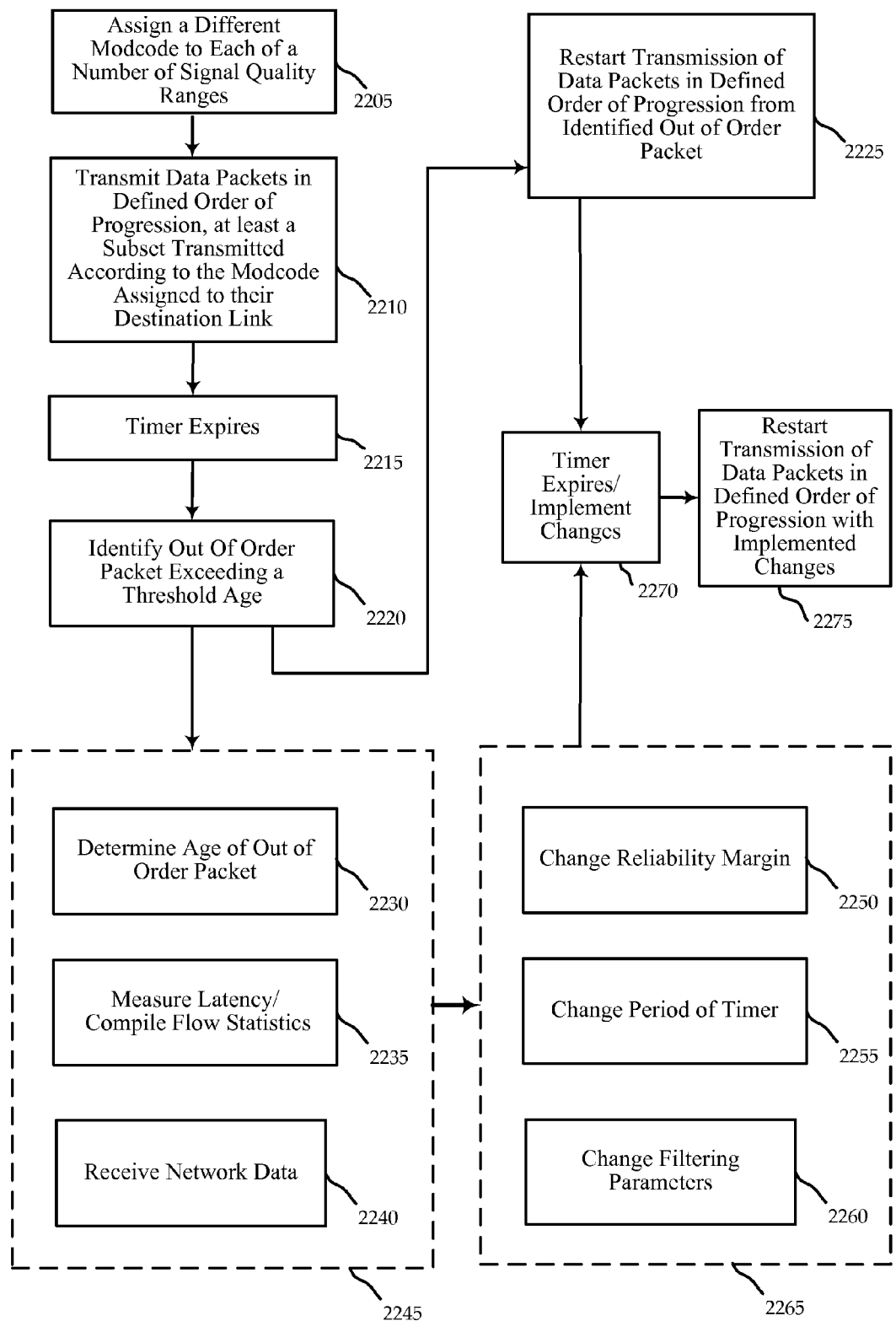
FIG. 22 is a flowchart illustrating an alternative process for modifying a reliability margin configured according to various embodiments of the present invention.

FIG. 22 is a flowchart illustrating an alternative process 2200 for controlling the flow of data traffic by dynamically modifying certain factors in an ACM system. The process may be performed, for example, in whole or in part by the device 1900 of FIG. 19. At block 2205, a different modcode is assigned to each of a number of signal quality ranges. At block 2210, data packets are transmitted in a defined order of progression, at least a subset is transmitted according to the modcode assigned to their destination link. At block 2215, a timer expires, and an out of order packet exceeding a threshold age is identified at block 2220, thereby interrupting the defined order of progression.

At block 2225, transmission of data packets is restarted in a defined order of progression from the identified out of order packet. In parallel with block 2225, a range of latency and flow measurements may be made or received at block 2245. For example, the age of the out of order packet may be determined at block 2230, while in other embodiments, other latency measurements associated with the packet may be made as well. At block 2235, other latency factors attributed to a flow or the device 1900 may be measured, and additional flow statistics may be compiled or analyzed. Also, network data may be received at block 2240.

This range of latency and flow measurements 2245 may be used, in whole or in part, to calculate a modification to one or more parameters from a group of traffic shaping and flow control parameters 2265. At block 2250, the reliability margin attributable to one or more modcodes may be changed in light of the latency and flow measurements 2245. At block 2255, the period for the timer may be changed in light of the latency and flow measurements 2245. At block 2260, the filtering rules related to blocking or selective blocking based on QoS/CoS may be changed in light of the latency and flow measurements 2245.

At block 2270, upon the next expiration of the timer, the modifications to one or more parameters from a group of traffic shaping and flow control parameters 2265 are implemented. At block 2275, transmission of data packets is restarted in a defined order of progression with the implemented changes.

It should again be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart or a flow diagram. Although they may describe the operations as a sequential process, many of the operations can be performed in parallel or concurrently. In addition, the order of the operations may be rearranged. A process is terminated when its operations are completed, but could have additional steps not included in the figure.

Moreover, as disclosed herein, the term "memory" may represent one or more devices or components thereof for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method of implementing adaptive coding and modulation in a satellite communications network, the method comprising:
   associating a first modcode of a first order with a first signal quality range;
   associating a second modcode of a second order higher than the first order with a second signal quality range of better quality than the first signal quality range;
   receiving a first packet destined for a first link within the first signal quality range and a second packet destined for a second link within the second signal quality range;
   encapsulating the first packet in a payload portion of a first frame;
   determining that an available portion of the payload portion is insufficient to fit the second packet;
   fragmenting the second packet into a first fragment sized to fill the available portion and a second fragment;
   encapsulating the first fragment in the available portion of the payload of the first frame; and
   transmitting the payload portion of the first frame in the satellite communications network according to the first modcode.

2. The method of claim 1, further comprising:
   varying at least one of the first signal quality range and the second signal quality range to modify a reliability margin for packets destined for a link within the varied signal quality range.

3. The method of claim 2, wherein the varying step comprises:
   varying at least one of the first signal quality range and the second signal quality range responsive to latency associated with the transmitting step.

4. The method of claim 1, further comprising:
   transmitting the second fragment in a second frame according to the second modcode.

5. The method of claim 1, wherein the encapsulating the first fragment step further comprises:
   applying a policy of encapsulating packets associated with different modcodes in one frame to be transmitted according to a lowest order modcode of the different modcodes, the policy applied when there are no remaining packets associated with the lowest order modcode.

6. The method of claim 5, wherein the applying step comprises:
   determining a length of a prospective pad for the first frame;
   determining that no packet associated with the first modcode remains to fill the prospective pad; and
   filling the prospective pad with the first fragment.

7. The method of claim 1, further comprising:
   transmitting additional frames in the broadcast signal according to a defined order of progression; and
   interrupting the defined order of progression upon expiration of a timer to transmit a packet exceeding a threshold age.

8. The method of claim 7, further comprising:
   varying a period of the timer responsive to a delay associated with transmitting the additional frames.

9. The method of claim 1, wherein,
   the associating the first modcode with the first packet comprises placing the first packet in a first packet forwarding queue associated with the first signal quality range; and
   the associating the second modcode with the second packet comprises placing the second packet in a second packet forwarding queue associated with the second signal quality range.

10. The method of claim 1, further comprising:
    inserting, in a linked list, a first element corresponding to the first packet and associated first signal quality;
    inserting, in the linked list, a second element corresponding to the second packet and associated second signal quality; and
    iterating through the linked list to identify a set of packets for encapsulation and transmission responsive to a signal quality associated with each element of the linked list.

11. The method of claim 1, wherein the adaptive coding and modulation is implemented in accordance with a DVB-S2 standard.

12. The method of claim 1, wherein the first and second signal quality ranges are ranges of signal quality comprising at least one of a signal to noise ratio, an estimated signal to noise ratio, a bit error rate, or a receive power level.

13. A device for implementing adaptive modeodes in a satellite communications network, the device comprising:
    a sorter configured to:
       associate a first modcode of a first order with a first packet to be received on a first link defined by a signal quality in a first signal quality range;
       associate a second modcode of a second order, higher than the first order, with a second packet to be received on a second link defined by a signal quality in a second signal quality range of better quality than the first signal quality range;

an encapsulator, communicatively coupled with the sorter, and configured to:
  encapsulate the first packet in a payload portion of a first frame;
  determine that an available portion of the payload portion is insufficient to fit the second packet;
  fragment the second packet into a first fragment sized to fill the available portion and a second fragment; and
  encapsulate the first fragment in the available portion of the payload of the first frame; and
a modulation and coding module, communicatively coupled with the encapsulator, and configured to encode and map a payload of the frame according to the first modcode.

14. The device of claim 13, wherein,
the sorter is further configured to vary at least one of the first signal quality range and the second signal quality range to modify a reliability margin for a transmitted packet destined for a link within the varied signal quality range.

15. The device of claim 13, wherein,
the sorter is further configured to vary at least one of the first signal quality range and the second signal quality range responsive to latency associated with the transmitting step.

16. The device of claim 13, wherein,
the encapsulator is further configured to:
  encapsulate the second fragment in a second frame to be transmitted according to the second modcode.

17. The device of claim 13, wherein,
the sorter is configured to group packets associated with different modcodes for encapsulation in one frame to be transmitted according to a lowest order modcode of the different modcodes, the grouping to occur when there are no remaining packets associated with the lowest order modcode.

18. The device of claim 13, further comprising a transmitter configured to:
  transmit additional frames in the broadcast signal according to a defined order of progression; and
  interrupt the defined order of progression upon expiration of a timer to transmit a packet exceeding a threshold age.

19. The device of claim 18, wherein,
the transmitter is further configured to vary a period of timer responsive to a latency associated with transmitting the additional frames.

20. A device for implementing adaptive coding and modulation in a satellite communications network, the device comprising:
  means for associating a first modcode of a first order with a first signal quality range;
  means for associating a second modcode of a second order with a second signal quality range, the second order being higher than the first order and the second signal quality range being of a better quality than the first signal quality range;
  means for receiving a plurality of first packets destined for a first link within the first signal quality range;
  means for receiving a plurality of second packets destined for a second link within the second signal quality range;
  means for encapsulating the first packet in a payload portion of a first frame;
  means for determining that an available portion of the payload portion is insufficient to fit the second packet;
  means for fragmenting the second packet into a first fragment sized to fill the available portion and a second fragment;
  means for encapsulating the first fragment in the available portion of the payload of the first frame; and
  means for transmitting the payload of the first frame through the satellite communications network according to the first modcode.

21. A device for implementing adaptive coding and modulation in a satellite communications network, the device comprising:
  a sorter configured to:
    associate a first modcode of a first order with a first packet to be transmitted on a first link defined by a signal quality in a first signal quality range;
    associate a second modcode of a second order with a second packet to be transmitted on a second link defined by a signal quality in a second signal quality range, the second order being higher than the first order and the second signal quality range being of a better quality than the first signal quality range;
    receive a plurality of first packets destined for one or more links within the first signal quality range; and
    receive a second packet destined for a second link within the second signal quality range;
  an encapsulator, communicatively coupled with the sorter, configured to:
    encapsulate the plurality of first packets in a payload portion of the first frame;
    determine that no packet associated with the first modcode remains to fill the frame;
    fragment the second packet into a first fragment sized to fill the available portion and a second fragment; and
    encapsulate the first fragment in the available portion of the payload of the first frame; and
  a modulation and coding module, communicatively coupled with the sorter, configured to encode and map the first frame according to the first modcode for transmission in the satellite communications network.

* * * * *

UNITED STATES PATENT AND TRADEMARK OFFICE
CERTIFICATE OF CORRECTION

PATENT NO.       : 7,680,040 B2
APPLICATION NO.  : 11/554206
DATED            : March 16, 2010
INVENTOR(S)      : William H. Thesling It is certified that error appears in the above-identified patent and that said Letters Patent is hereby corrected as shown below:

Column 28, at line 57, -- modeodes -- should be -- modcodes --

Signed and Sealed this

Fourth Day of May, 2010

David J. Kappos
*Director of the United States Patent and Trademark Office*